US010053125B2

(12) United States Patent
Reges et al.

(10) Patent No.: US 10,053,125 B2
(45) Date of Patent: Aug. 21, 2018

(54) PALLET TRUCK CART TRANSPORTATION DEVICE

(71) Applicant: Crown Equipment Corporation, New Bremen, OH (US)

(72) Inventors: Clinton Reges, Greenville, NC (US); David Hickman, Winterville, NC (US); Daniel Magoto, Russia, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 15/497,515

(22) Filed: Apr. 26, 2017

(65) Prior Publication Data

US 2017/0313335 A1 Nov. 2, 2017

Related U.S. Application Data

(60) Provisional application No. 62/329,694, filed on Apr. 29, 2016, provisional application No. 62/384,158, filed on Sep. 6, 2016.

(51) Int. Cl.
*B62D 21/14* (2006.01)
*B62B 3/06* (2006.01)
(Continued)

(52) U.S. Cl.
CPC ........ *B62B 3/0612* (2013.01); *B65D 19/0004* (2013.01); *B65D 19/44* (2013.01);
(Continued)

(58) Field of Classification Search
CPC ......... B62B 3/02; B62B 3/0612; B65D 19/44; B65D 19/385; B65D 19/0004
See application file for complete search history.

(56) References Cited

U.S. PATENT DOCUMENTS

| 4,032,165 A | 6/1977 | Russell |
| 4,067,454 A * | 1/1978 | Helbling .................. A24B 1/08 |
| | | 211/117 |

(Continued)

FOREIGN PATENT DOCUMENTS

| EP | 1022185 A2 | 7/2000 |
| EP | 2520538 A1 | 11/2012 |
| WO | 2015131871 A2 | 9/2015 |

OTHER PUBLICATIONS

Lindner, Volker; International Search Report and Written Opinion; International Application No. PCT/US2017/029574; dated Aug. 4, 2017; European Patent Office; Rijswijk, Netherlands.

*Primary Examiner* — Hau Van Phan
(74) *Attorney, Agent, or Firm* — Stevens & Showalter, LLP

(57) ABSTRACT

A cart transportation assembly includes a frame including at least one upright and a top rail supported by the upright(s). The top rail includes a main body portion, an actuation rod, and at least one cart latch coupled to the actuation rod. The actuation rod is movable relative to the main body portion to transition the cart latch(es) between release and restrain positions. A platform provides structural support for the frame and includes a deck for supporting at least one cart. The cart latch(es), when in the release position, is/are adapted to allow movement of the at least one cart on the deck of the platform. The cart latch(es), when in the restrain position, is/are adapted to restrain movement of the at least one cart on the deck of the platform by pulling the at least one cart towards and against or in close proximity to the frame.

20 Claims, 21 Drawing Sheets

(51) Int. Cl.
   *B65D 19/00* (2006.01)
   *B65D 19/44* (2006.01)

(52) U.S. Cl.
   CPC .............................. *B62B 2203/70* (2013.01); *B65D 2519/00805* (2013.01); *B65D 2519/00815* (2013.01)

(56) References Cited

U.S. PATENT DOCUMENTS

| | | | | |
|---|---|---|---|---|
| 4,388,037 | A * | 6/1983 | Suarez | B62B 3/0618 280/43.12 |
| 6,435,803 | B1 | 8/2002 | Robinson | |
| 7,854,444 | B2 * | 12/2010 | Zhuang | B62B 3/02 280/651 |
| 7,918,165 | B2 * | 4/2011 | Owen | B65D 19/385 108/55.1 |
| 8,256,357 | B2 * | 9/2012 | Kelly | F16N 31/006 108/55.3 |
| 8,591,154 | B2 | 11/2013 | Bartels | |
| 8,894,037 | B1 | 11/2014 | Brauer et al. | |
| 9,751,658 | B1 * | 9/2017 | Brauer | B65D 19/44 |
| 2007/0019421 | A1 * | 1/2007 | Kregness | B60Q 1/24 362/427 |
| 2013/0189046 | A1 | 7/2013 | Bartels | |

* cited by examiner

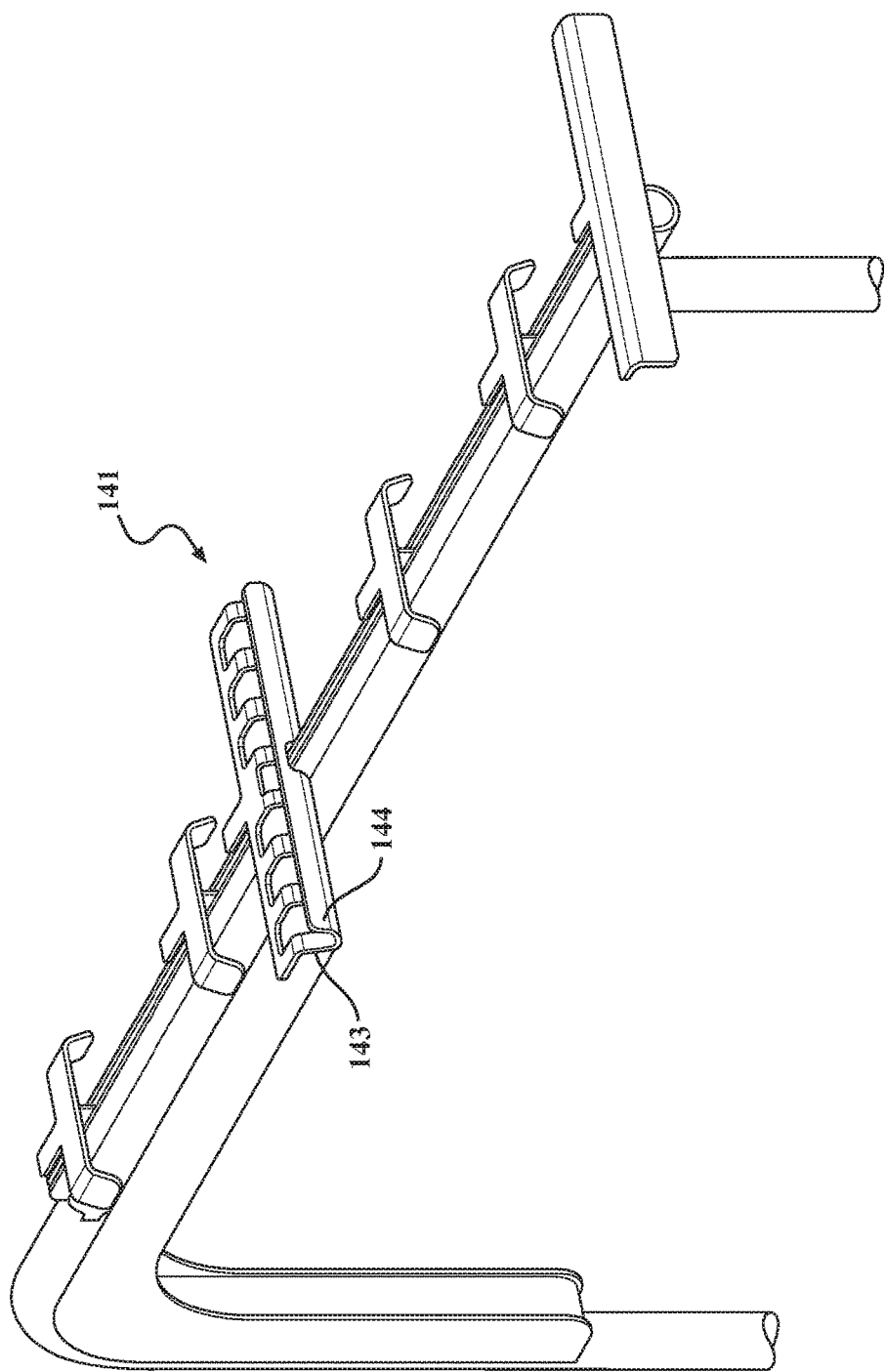

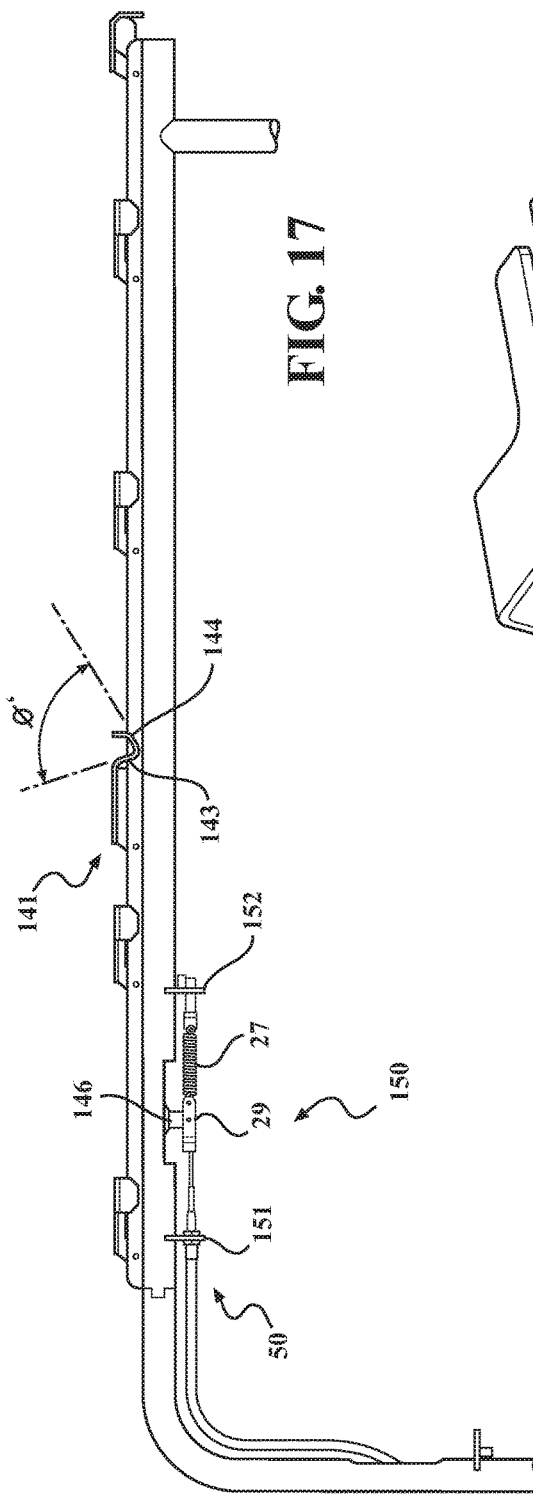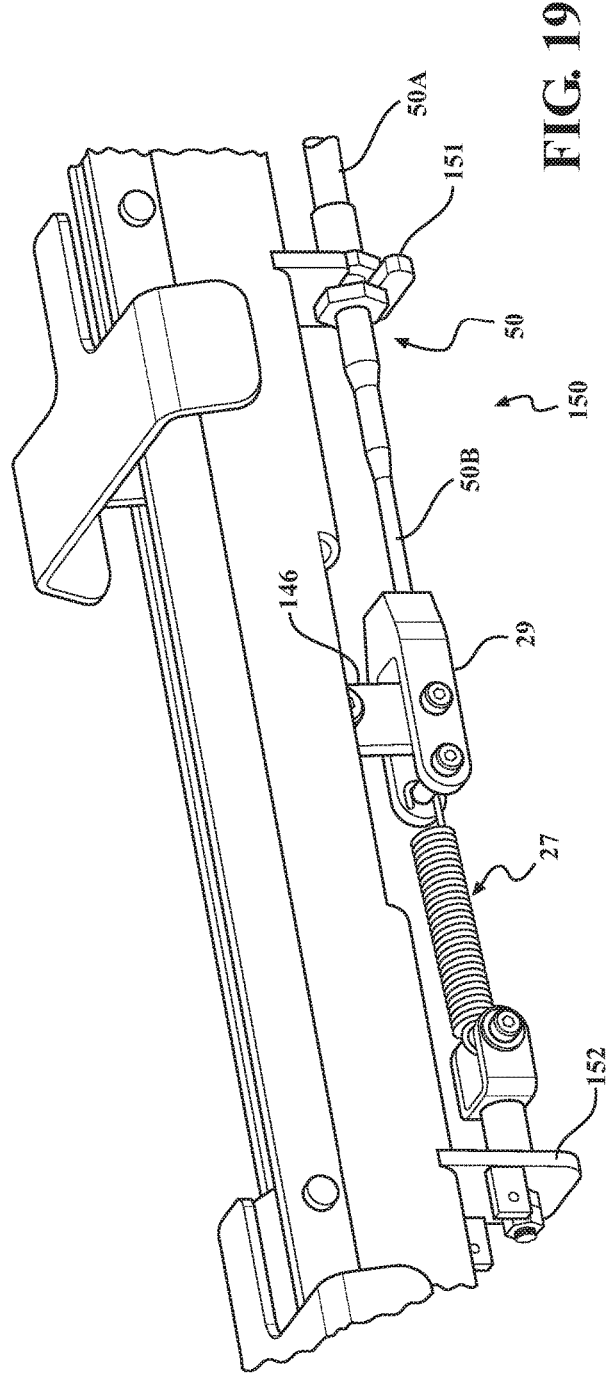

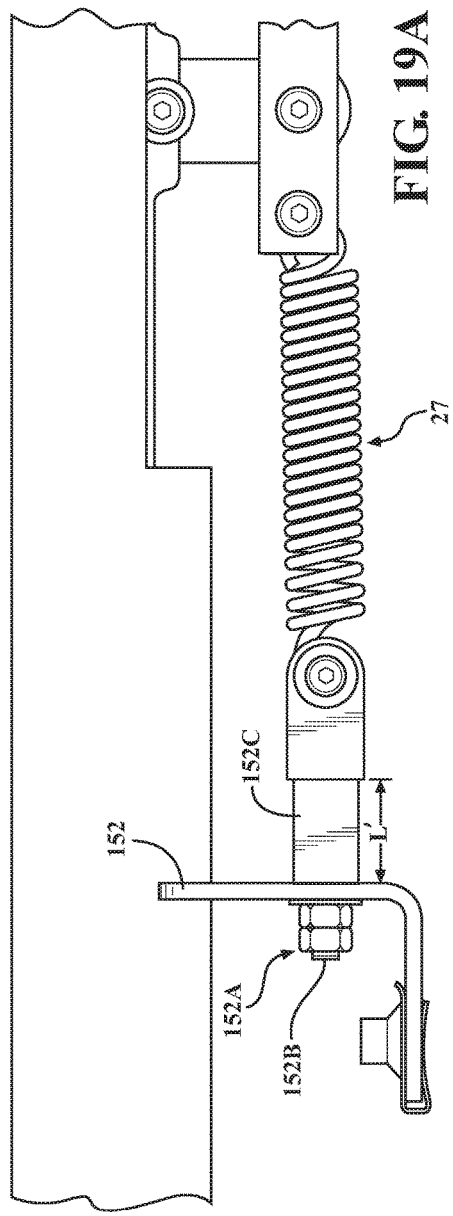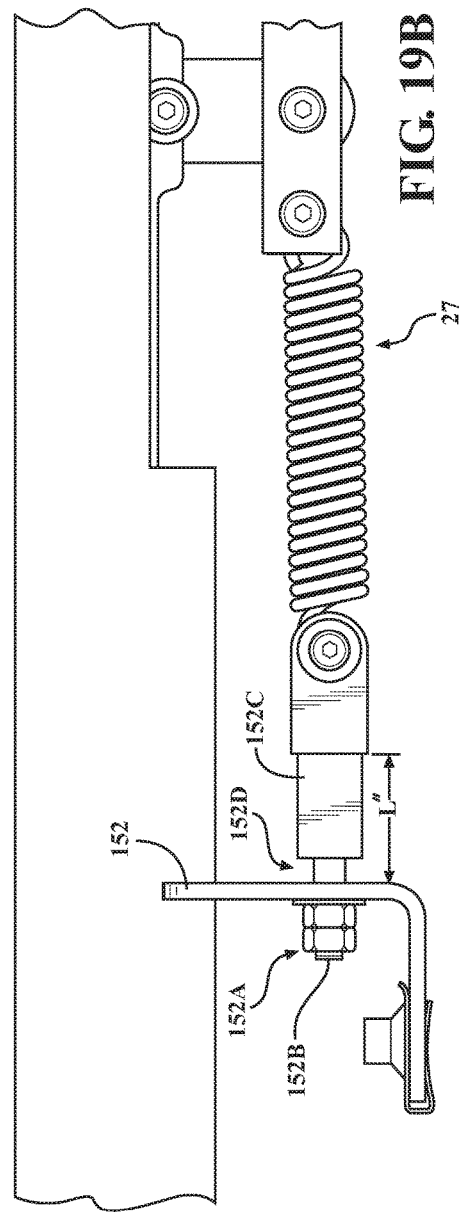

PALLET TRUCK CART TRANSPORTATION DEVICE

CROSS REFERENCE TO RELATED APPLICATIONS

This application claims the benefit of U.S. Provisional Patent Application Ser. No. 62/329,694, filed Apr. 29, 2016, and entitled "PALLET TRUCK CART TRANSPORTATION DEVICE"; and 62/384,158, filed Sep. 6, 2016, and entitled "PALLET TRUCK CART TRANSPORTATION DEVICE"; the entire disclosures of which are hereby incorporated by reference herein.

FIELD OF THE INVENTION

The present disclosure relates to industrial vehicles and transportation assemblies for transporting, for example, rolling racks.

BACKGROUND OF THE INVENTION

Rolling racks may be used in a warehouse or elsewhere for moving goods from one place to another. Such rolling racks generally include wheels on the bottom that allow the racks to be easily moved along the ground. It may be desirable to move multiple rolling racks at once, which may be done on a rack transportation assembly.

SUMMARY OF THE INVENTION

One aspect of the present invention relates to a cart transportation assembly comprising: a frame including at least one upright and a top rail supported by the at least one upright. The top rail comprises a main body portion, an actuation rod, and a plurality of cart latches coupled to the actuation rod, wherein the actuation rod is movable relative to the main body portion to transition the cart latches between release and restrain positions. A platform of the cart transportation assembly provides structural support for the frame and includes a deck for supporting at least one cart. The cart latches, when in the release position, are adapted to allow movement of the at least one cart on the deck of the platform. The cart latches, when in the restrain position, are adapted to restrain movement of the at least one cart on the deck of the platform by pulling the at least one cart towards and against or in close proximity to the frame.

The actuation rod may move horizontally within an interior portion of the top rail.

The cart latches may pivot with respect to the main body portion when transitioning between the release and restrain positions. Each cart latch may be coupled to the actuation rod via a respective actuation pin, and each cart latch may be coupled to the main body portion via a respective pivot pin.

The cart transportation assembly may further comprise an extension spring that biases the actuation rod such that the cart latches are at rest in the release position.

The cart latches may comprise tapered side wings that facilitate pulling the at least one cart towards and against or in close proximity to the frame.

The frame may further comprise a center cart latch that, when in the restrain position, is adapted to separate two carts that are on the deck of the platform.

The frame may further comprise a cart stop that is also transitioned between the release and restrain positions by the actuator rod, wherein the cart stop, while in the restrain position, is adapted to restrain movement of the at least one cart in a longitudinal direction of the platform.

The cart transportation assembly may further comprise an actuation cable coupled to the actuation rod, the actuation cable effecting movement of the actuation rod relative to the main body portion. Movement of the actuation cable may be driven by a lift cylinder of an associated industrial vehicle.

The transition between the release and restrain position and vice versus may occur when the platform is in close proximity to the floor.

The deck may comprise at least one wheel guide for restraining at least one wheel of the at least one cart.

Another aspect of the present invention relates to a cart transportation assembly comprising a frame including at least one upright and a top rail supported by the at least one upright. The top rail comprises a main body portion, an actuation rod, and at least one cart latch coupled to the actuation rod. The actuation rod is movable horizontally within an interior portion of the main body portion to transition the at least one cart latch between release and restrain positions. A platform of the cart transportation assembly provides structural support for the frame and includes a deck and a ramp. The at least one cart latch, when in the release position, is adapted to allow movement of at least one cart on the deck of the platform. The at least one cart latch, when in the restrain position, is adapted to restrain movement of the at least one cart on the deck of the platform by pulling the at least one cart towards and against or in close proximity to the frame.

The at least one cart latch may pivot with respect to the main body portion when transitioning between the release and restrain positions. The at least one cart latch may be coupled to the actuation rod via an actuation pin, and the at least one cart latch may be coupled to the main body portion via a pivot pin.

The cart transportation assembly may further comprise an extension spring that biases the actuation rod such that the at least one cart latch is at rest in the release position.

The at least one cart latch may comprise tapered side wings that facilitate pulling the at least one cart towards and against or in close proximity to the frame.

The frame may further comprise a center cart latch that, when in the restrain position, is adapted to separate two carts that are on the deck of the platform.

The frame may further comprise a cart stop that is also transitioned between the release and restrain positions by the actuator rod, wherein the cart stop, while in the restrain position, is adapted to restrain movement of the at least one cart in a longitudinal direction of the platform.

The cart transportation may further comprise an actuation cable coupled to the actuation rod, the actuation cable effecting movement of the actuation rod relative to the main body portion, wherein movement of the actuation cable is driven by a lift cylinder of an associated industrial vehicle.

BRIEF DESCRIPTION OF THE DRAWINGS

The embodiments set forth in the drawings are illustrative and not intended to limit the subject matter defined by the claims. The following detailed description of the illustrative embodiments can be understood when read in conjunction with the following drawings, where like structure is indicated with like reference numerals and in which:

FIG. 16 depicts a front isometric view of a top rail according to one or more embodiments shown and described herein;

FIG. 17 depicts a side view of the top rail according to one or more embodiments shown and described herein;

FIG. 19 depicts a cable assembly according to one or more embodiments shown and described herein;

FIGS. 19A and 19B depict isolated views of an assembly used to adjust a preload of an extension spring according to one or more embodiments shown and described herein.

DETAILED DESCRIPTION

Figure 1:
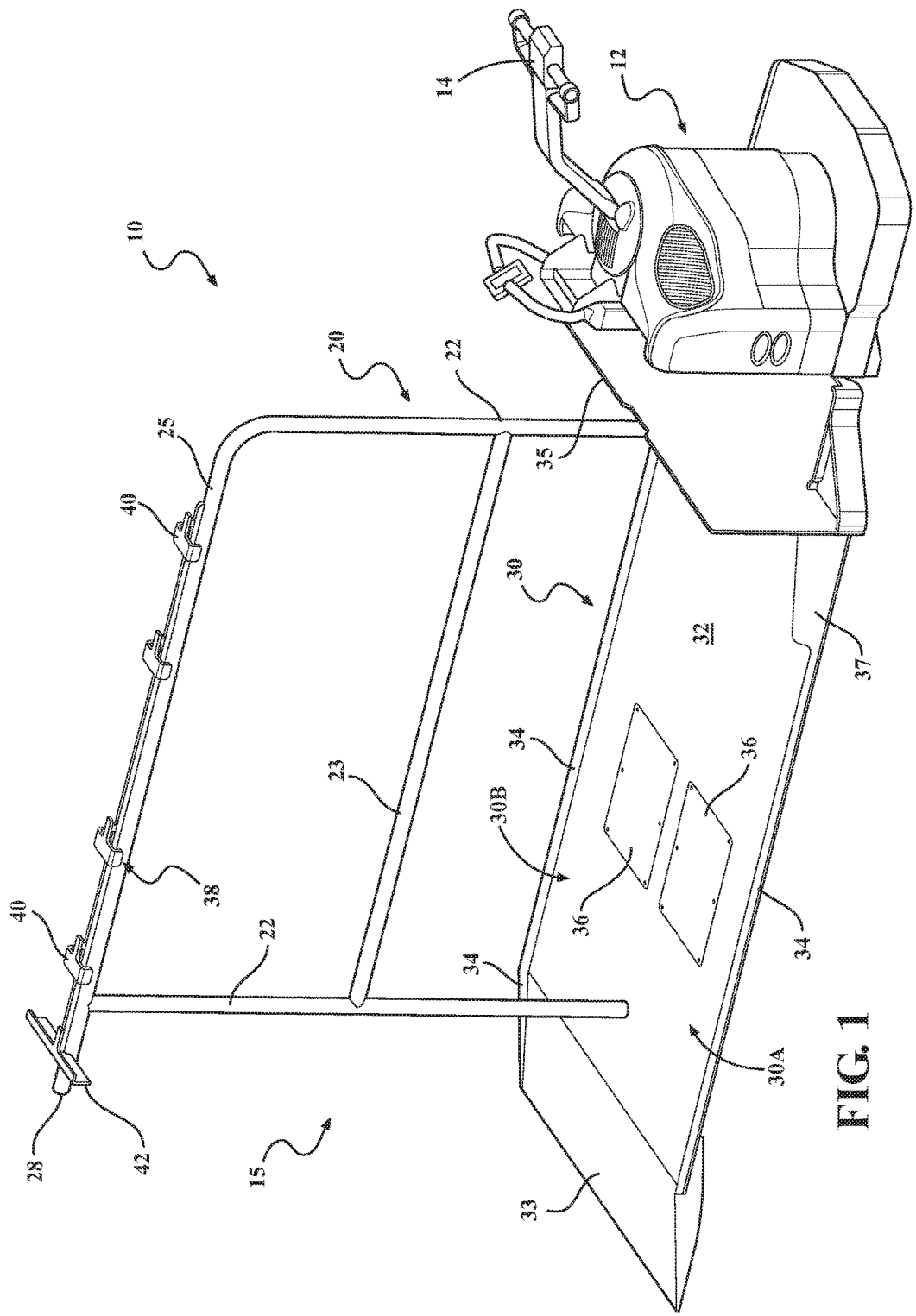
FIG. 1 depicts an isometric view of an industrial vehicle according to one or more embodiments shown and described herein.
Figure 2:
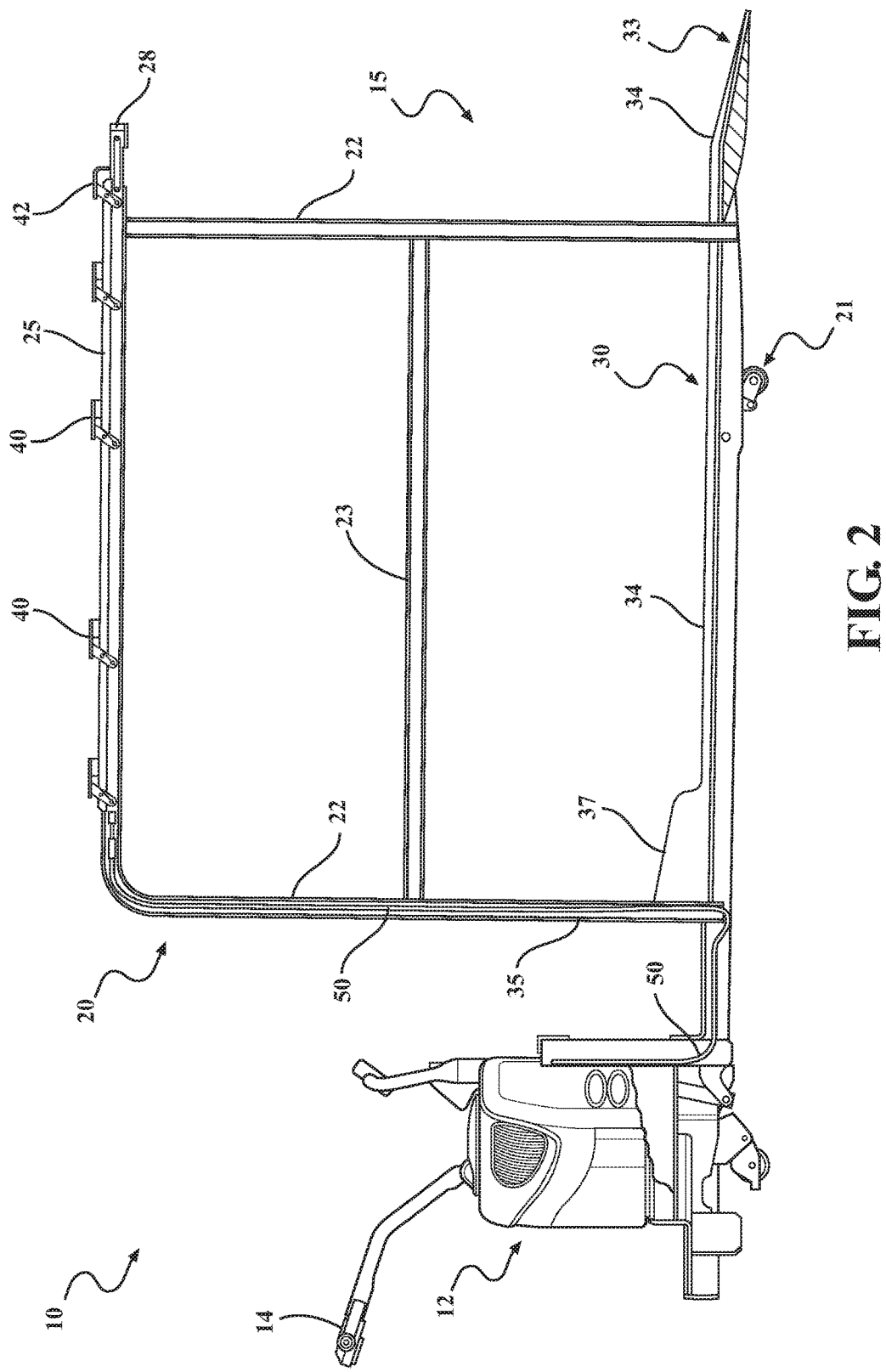
FIG. 2 depicts a left side view of the industrial vehicle according to one or more embodiments shown and described herein.
Figure 3:
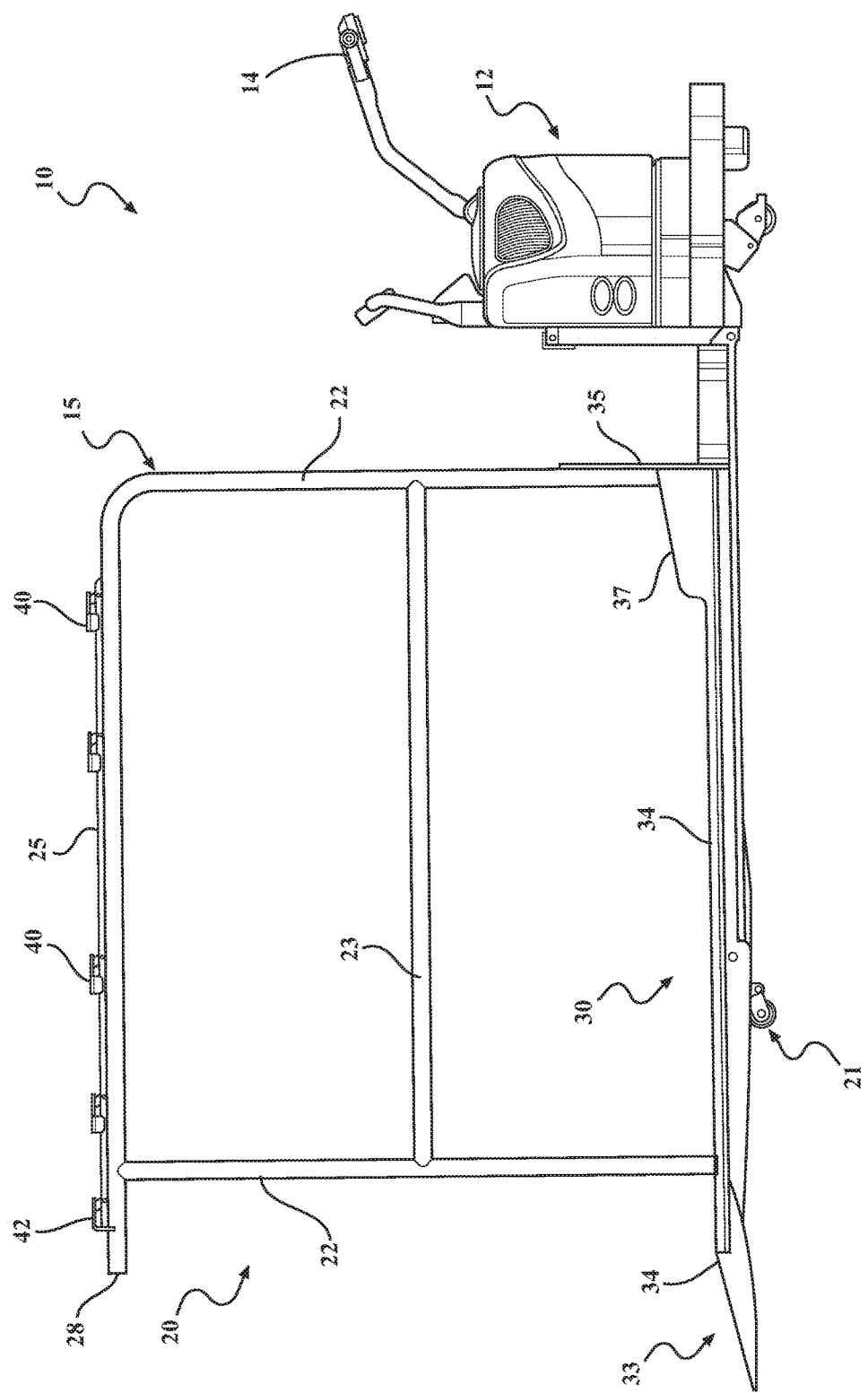
FIG. 3 depicts a right side view of the industrial vehicle according to one or more embodiments shown and described herein.

The following text sets forth a broad description of numerous different embodiments of the present disclosure. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. It should be understood that multiple combinations of the embodiments described and shown are contemplated and that a particular focus on one embodiment does not preclude its inclusion in a combination of other described embodiments. Numerous alternative embodiments could be implemented, using either current technology or technology developed after the filing date of this patent, which would still fall within the scope of the claims. All publications and patents cited herein are incorporated herein by reference.

Referring to FIGS. 1-4, an industrial vehicle 10 is shown comprising a drive unit 12 coupled to a cart transportation assembly 15. The cart transportation assembly 15 comprises a frame 20 and a platform 30. The frame 20 comprises one or more uprights 22, one or more cross members 23, and a top rail 25. The platform 30 comprises a deck 32, a ramp 33, one or more side lips 34, one or more tapered side lips 37, a back wall 35, and optionally one or more maintenance access panels 36. The top rail 25 comprises a main body portion 25A that defines an interior surface 25B (See FIGS. 5 and 6), one or more cart latches 40, an end cap 28, and a cart stop 42 and is coupled to the one or more uprights 22. The optional one or maintenance access panels 36 may be used to maintain, repair, and/or replace one or more load wheel assemblies 21.

It is contemplated that the frame 20 is metal tubing, composite tubing, angle iron, or other rigid structure or material that is suitable for an industrial environment. The frame 20 is a vertical structure to separate the platform 30 into two or more areas, e.g., 30A, 30B, see FIGS. 1 and 4, and provides structural support for the top rail 25. The one or more cross members 23 serve to further separate the platform 30 between the top rail 25 and the deck 32, provide structural rigidity to the frame 20, and is/are coupled between the upright(s) 22. The one or more uprights 22 provide the structural support for the top rail 25 and sets the height of the top rail 25. In one embodiment, the vertical height of the one or more uprights 22 may be adjustable to accommodate different height carts 70 (see FIG. 10).

It is contemplated that the one or more side lips 34 and the one or more tapered side lips 37 provide a guide for the one or more carts 70 and confine any movement of the carts 70 to the surface area of the deck 32. It is also contemplated that one or more wheel guides (shown in FIGS. 12-14 and described below) may be coupled to or formed within the deck 32 to aid a user in positioning the carts 70 on the platform 30 by guiding the wheels of each cart 70 along a specified path on the deck 32. In one embodiment, the one or more wheel guides may be positioned such that they only guide one set of wheels of the cart 70. In other words, the "front" wheels of each cart 70 may have a wider stance than the "rear" wheels of each cart 70. The one or more wheel guides may be positioned such that they only guide the narrower set of wheels or the "rear" wheels in this embodiment. This is advantageous if the "rear" wheels are fixed and the "front" wheels are casters to aid a user in loading or unloading the carts 70 from the cart transportation assembly 15.

Figure 5:
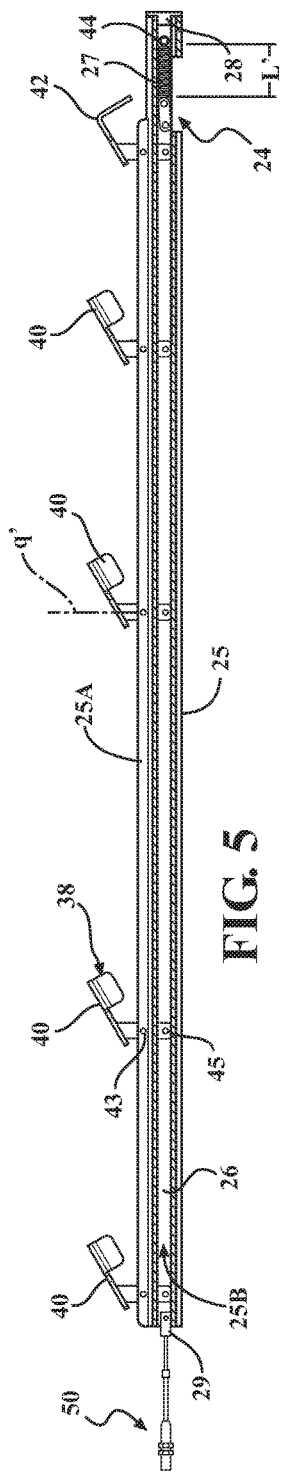
FIG. 5 depicts a left side cross-sectional view of a top rail according to one or more embodiments shown and described herein.
Figure 6:
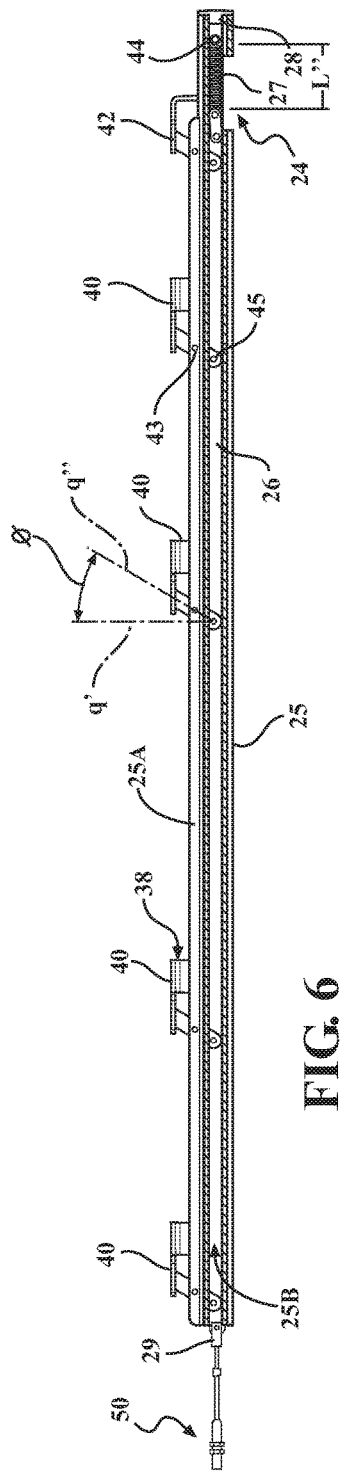
FIG. 6 depicts a left side cross-sectional view of the top rail according to one or more embodiments shown and described herein.

FIGS. 5 and 6 illustrate the inner workings of a contemplated embodiment of the top rail 25, which comprises an actuation rod 26, an extension spring 27, a yoke block 29, and an assembly access opening 24 in addition to the end cap 28, the one or more cart latches 40, and the cart stop 42. The actuation rod 26 is provided within the interior portion 25B of the actuation rod main body portion 25A, and is coupled to the one or more cart latches 40, the yoke block 29, and the extension spring 27. An actuation pin 45 couples a respective cart latch 40 to the actuation rod 26 and a pivot pin 43 pivotally couples the respective cart latch 40 to the top rail main body portion 25A such that the cart latches 40 are pivotally movable with respect to the top rail main body portion 25A. Similarly, an actuation pin 45 and a pivot pin 43 serve to couple the cart stop 42 to the actuation rod 26 and top rail main body portion 25A, respectively. It is contemplated that the actuation rod 26 moves horizontally within the interior portion 25B of the actuation rod main body portion 25A, which causes the cart latches 40 and the cart stop 42 to move, e.g., pivot, relative to the top rail main body portion 25A, to transition between a release position illustrated by FIG. 5 and a restrain position illustrated by FIG. 6. In the release position, one or more carts 70 (see FIG. 10) are free to move about the platform 30 (see FIG. 1) and be loaded and unloaded from the cart transportation assembly 15 (see FIG. 1). In the restrain position, the one or more carts 70 are restrained in their freedom of movement on the platform 30 and they are not able to be removed from the cart transportation assembly 15.

It is contemplated that the actuation rod 26 will simultaneously transition the one or more cart latches 40 and the cart stop 42 between the release position illustrated by FIG. 5 and the restrain position illustrated by FIG. 6. In the release position, the pivot pin 43 and the actuation pin 45 are about vertically aligned along axis q' to define the release position of the cart latches 40, as shown in FIG. 5. In the restrain position, the pivot pin 43 and the actuation pin 45 are aligned along axis q" which is offset from axis q' by angle ø, to define the restrain position of the cart latches 40, as shown in FIG. 6. It is contemplated that angle ø may be varied and/or adjusted by the stroke of the actuation rod 26. One or more stops (not shown) may be used in the top rail 25 to define the stroke of the actuation rod 26. One measure of the stroke is the contraction and extension of the extension spring 27 between the release and restrain position as measured by L' and L", see FIGS. 5 and 6, respectively. The extension spring 27 is coupled between a base point 44 and the actuation rod 26. The base point 44 may be defined by a pin, a knob, or other structure to serve as a fixed point for the extension spring 27. It is contemplated that the extension spring 27 exerts a biasing force, which force may be adjustable, on the actuation rod 26 such that the actuation rod 26 is at rest in the release position, as will be described below with reference to FIGS. 19A and 19B. In other words, the extension spring 26 contracts in the release position such that L' is less than L".

In one embodiment, the one or more cart latches 40 and the cart stop 42 move vertically along the vertical axis q'. According to this embodiment, the one or more cart latches 40 and the cart stop 42 are coupled to linkage (not shown) which will impart the vertical only movement. For example, and not by way of limitation, the linkage could be one or more push/pull cables coupled to the actuation rod 26 which, when transitioned between the release and restrain positions, exerts a force on each cart latch 40 and the cart stop 42 through a direction tubing in the vertical direction. In this way, each cart latch 40 and the cart stop 42 move along the vertical axis q' without any rotational movement.

The end cap 28 prevents access to the interior portion 25B of the top rail 25 as well as a second cap (not shown) for the assembly access opening 24. It is contemplated that the assembly access opening 24 and the opening covered by the end cap 28 will allow for the assembly and coupling of the one or more cart latches 40, cart stop 42, actuation rod 26, and extension spring 27 to the top rail 25.

Figure 7:
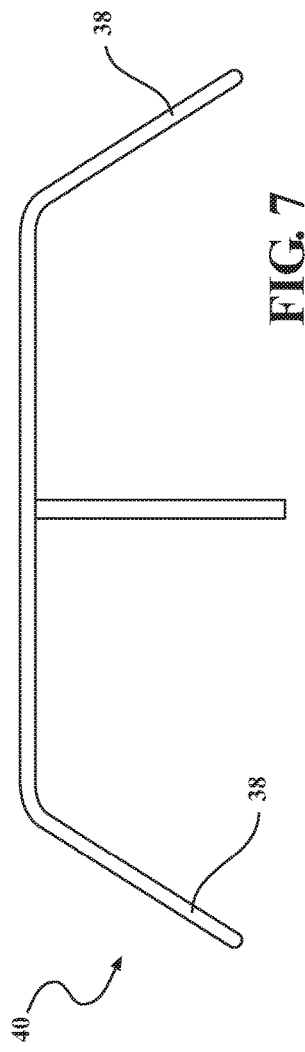
FIG. 7 depicts a front view of a cart latch according to one or more embodiments shown and described herein.

Referring to FIGS. 1, 4, 5 and 7, the cart latches 40 comprise one or more tapered restrain wings 38, see FIG. 7. The taper of each of the tapered restrain wings 38 pulls the carts 70 on the platform 30 towards and against or in close proximity to the frame 20 as the actuation rod 26 and the cart latches 40 transition from the release position to the restrain position. Whereas the one or more cart latches 40 restrain the movement of the carts laterally on the platform 30 while in the restrain position, the cart stop 42 and the back wall 35 restrain the movement of the carts 70 in the longitudinal direction on the platform 30 while in the restrain position.

Figure 8:
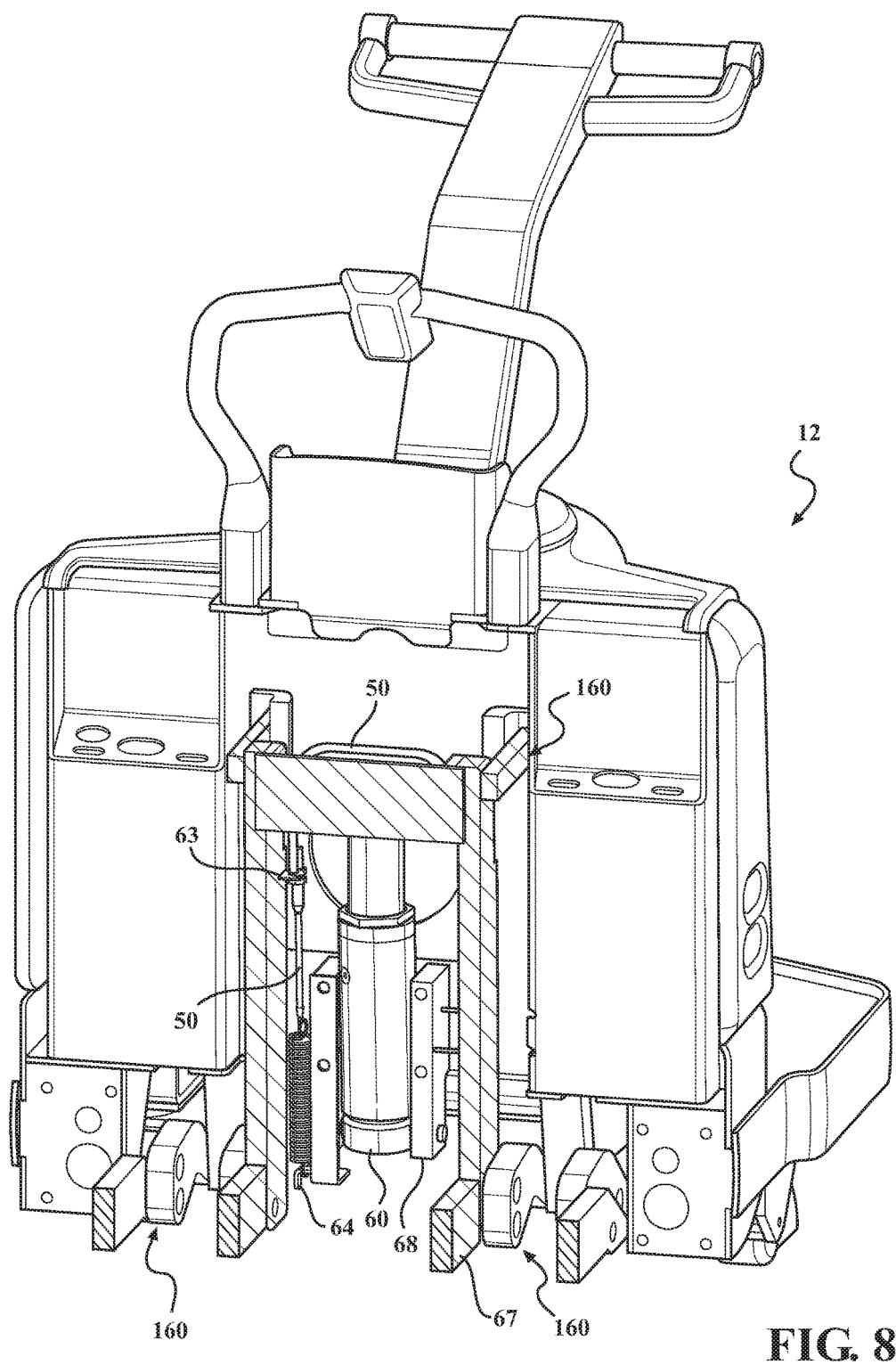
FIG. 8 depicts a front perspective view of a drive unit according to one or more embodiments shown and described herein.
Figure 9:
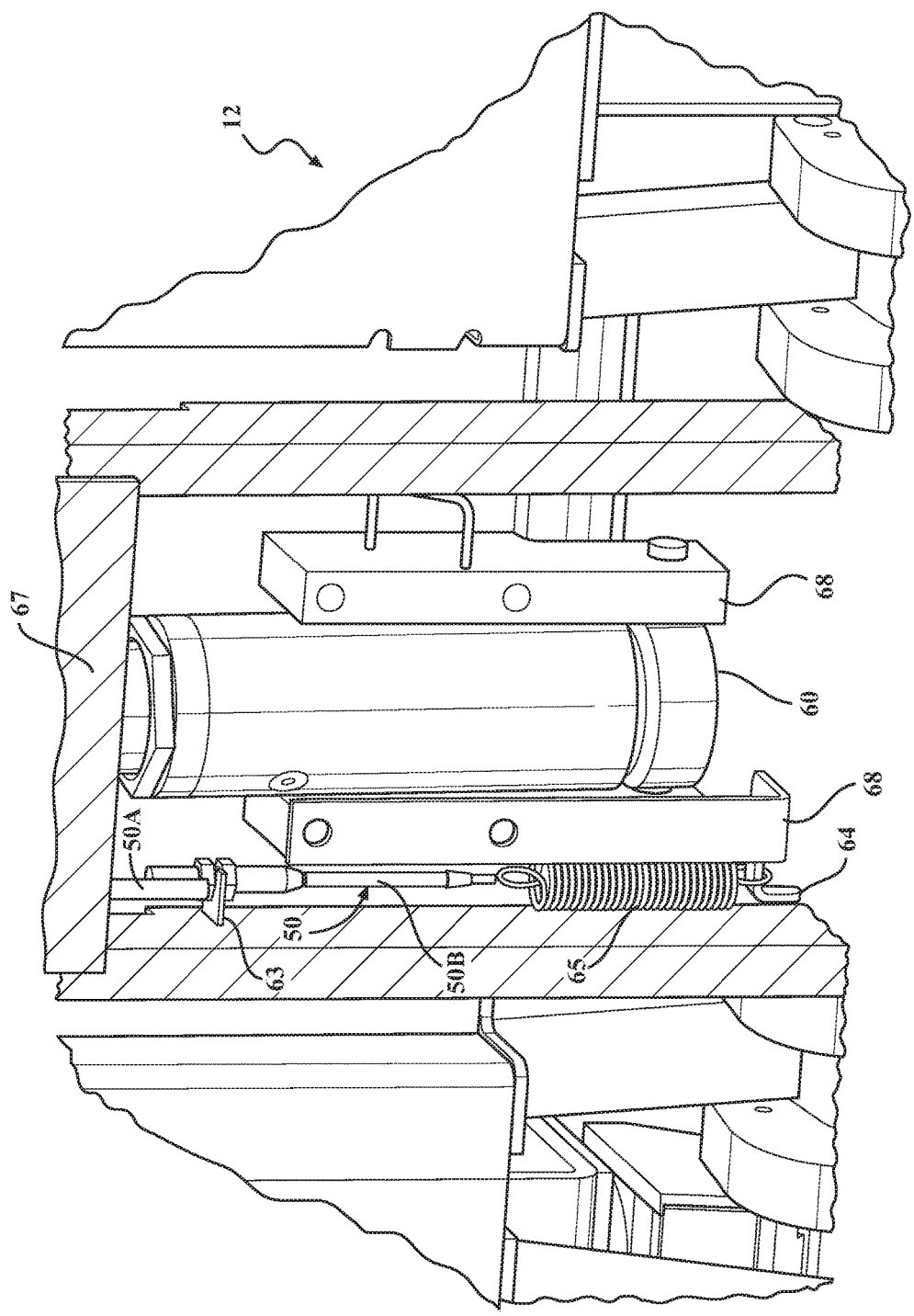
FIG. 9 depicts a front perspective view of a lift cylinder according to one or more embodiments shown and described herein.

FIGS. 8 and 9 illustrate a drive unit 12 comprising a lift cylinder 60, an actuation cable 50, a lift flange 63, a base flange 64, a cable spring 65, a lift assembly 67, and a cylinder mount 68. The lift cylinder 60 is coupled to the drive unit 12 and the cylinder mount 68. The base flange 64 is coupled to the cylinder mount 68. The lift cylinder 60 is also coupled to the lift assembly 67 (represented by hatching). The lift assembly 67 is coupled to the cart transportation assembly 15 (see FIG. 1) and the lift flange 63. The lift cylinder 60 raises and lowers the cart transportation assembly 15. As the lift cylinder 60 raises, a lift distance D between the lift flange 63 and base flange 64 (see FIG. 9) increases, and as the lift cylinder 60 lowers, the lift distance D between the lift flange 63 and the base flange 64 decreases. As further described below, this configuration serves to transition the actuation rod 26 (see FIGS. 5 and 6) between the aforementioned release and restrain positions. Specifically, a sheath 50A of the actuation cable 50 is coupled to the lift flange 63, and an inner cable portion 50B of the actuation cable 50 is coupled to the cable spring 65. The actuation cable 50 may be a push/pull type cable used to transition the actuation rod 26, cart latches 40, and cart stop 42 between the release and restrain positions.

The cable spring 65 is coupled between the actuation cable 50 and the base flange 64. It is contemplated that the actuation rod 26 (see FIGS. 1-4) transitions between two stops that serve to limit the stroke of the actuation rod 26 and the angle ø (see FIG. 6). The cable spring 65 extends when the actuation rod 26 touches one of the stops to allow the lift cylinder 60 to fully raise without breaking the stop, actuation cable 50, the base flange 64 and/or the components of the top rail 25. It is contemplated that the spring constant k under Hooke's law of the cable spring 65 is greater than that of the extension spring 27 (see FIG. 5).

Referring to FIGS. 2, 5, 6, 8, and 9, the actuation cable 50 couples the yoke block 29 to base flange 64. In operation, as the lift cylinder 60 raises the cart transportation assembly 15, the change in the lift distance D between the lift flange 63 and the base flange 64 transitions the actuation rod 26 from the release position (see FIG. 5) to the restrain position (See FIG. 6). In the raised position, any carts 70 on the platform 30 are restrained from movement on the platform 30 by the cart latches 40. As the lift cylinder 60 lowers the cart transportation assembly 15, the change in the lift distance D between the lift flange 63 and the base flange 64 transitions the actuation rod 26 from the restrain position to the release position. It is contemplated that the carts 70 are free to move on the platform 30 only when the cart transportation assembly 15 is lowered such that the ramp 33 is close to or touches the floor upon which the cart transportation assembly 15 rests. In other words, the transition of the actuation rod 26 between the release and restrain position occurs when the ramp 33 is near or on the floor.

Figure 10:
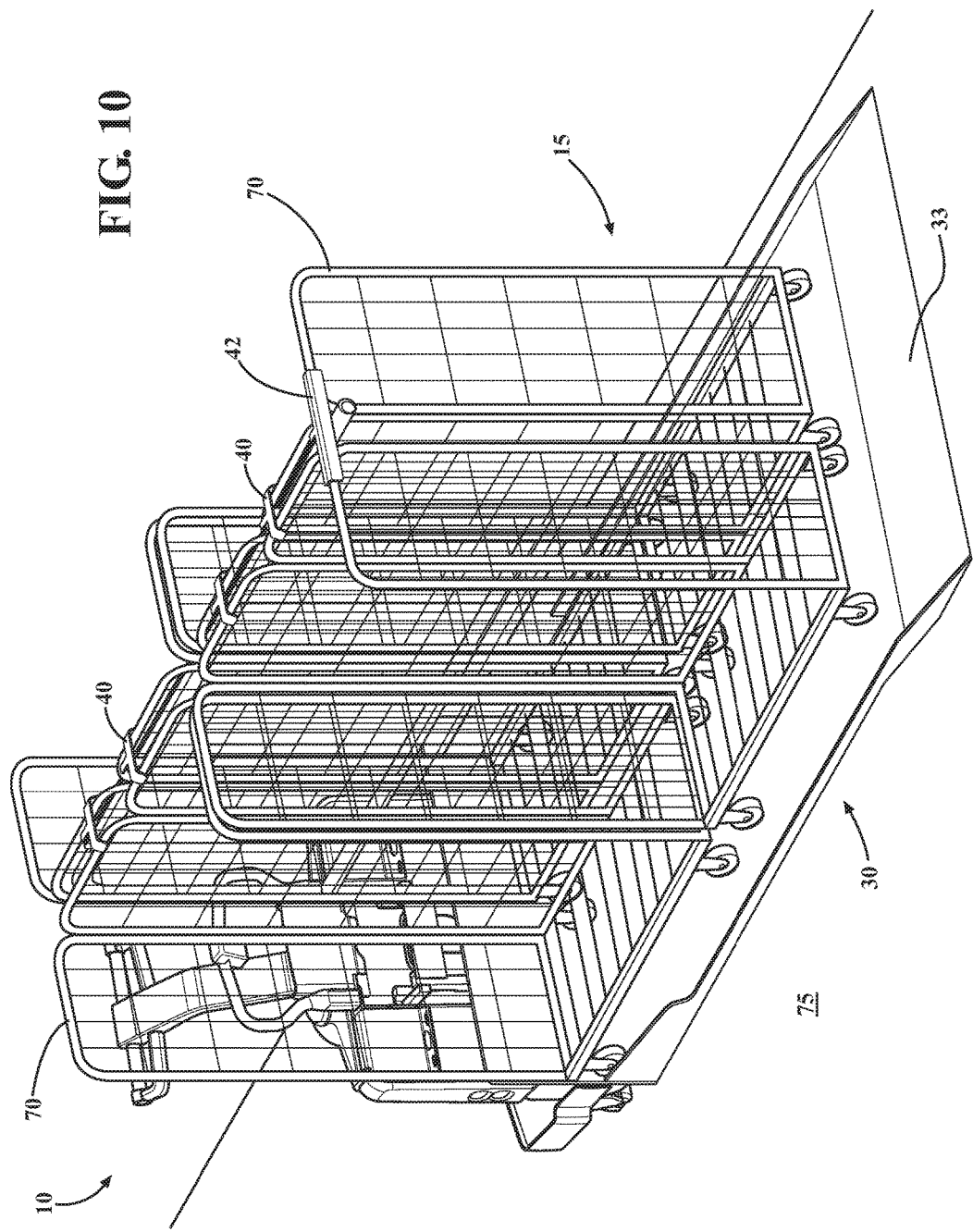
FIG. 10 depicts an isometric view of the industrial vehicle according to one or more embodiments shown and described herein.

FIG. 10 illustrates one or more carts 70 on the platform 30 of the industrial vehicle 10. For example, and not by way of limitation, a user may use the controls of the drive unit 12 to lower the cart transportation assembly 15 to the floor 75 such that the ramp 33 is close to or touches the floor 75. In this position, the one or more cart latches 40 and the cart stop 42 are in the release position. The user may load or unload one or more of the carts 70 as the carts 70 are free to move upon the platform 30. Once the desired number of carts 70 are loaded onto the platform 30 for movement to another area, the user uses the controls of the drive unit 12 to command the lift cylinder 60 (see FIGS. 8 and 9) to raise the cart transportation assembly 15. As the cart transportation assembly 15 is raised, the actuation rod 26 is caused to move horizontally within the interior portion 25B of the actuation rod main body portion 25A to the restrain position, which correspondingly moves the one or more cart latches 40 and the cart stop 42 to the restrain position. The carts 70 are restrained from substantial movement on the platform 30 in this position. Once raised to the desired height, the user may operate the industrial vehicle 10 and move the carts 70 to another location. It should be understood that although FIG. 10 illustrates four carts 70 on the cart transportation assembly 15, it is contemplated that any number of carts 70 may be placed upon the cart transportation assembly 15 depending on the dimensions of each cart 70 and the dimensions of the platform 30.

It is contemplated that the stroke of the actuation rod 26 (see FIG. 5) is short enough such that the transition between the release and restrain position occurs when the platform 30 is in close proximity to the floor 75. The cable spring 65 extends to allow for the lift cylinder 60 full range of motion without breaking the actuation cable 50 (see FIG. 9), base flange 64 (see FIG. 9), and/or the parts of the cart transportation assembly 15.

In one embodiment, the actuation cable 50 may be replaced with an electric motor or linear actuator. In such an embodiment, a sensor (not shown) coupled to the drive unit 12 would indicate if the lift cylinder 60 was lowered to the floor 75 or raised from the floor 75. The motor or linear actuator would transition the actuation rod 26 between the release and restrain position and vice versus using the state indicated by the sensor.

Figure 11:
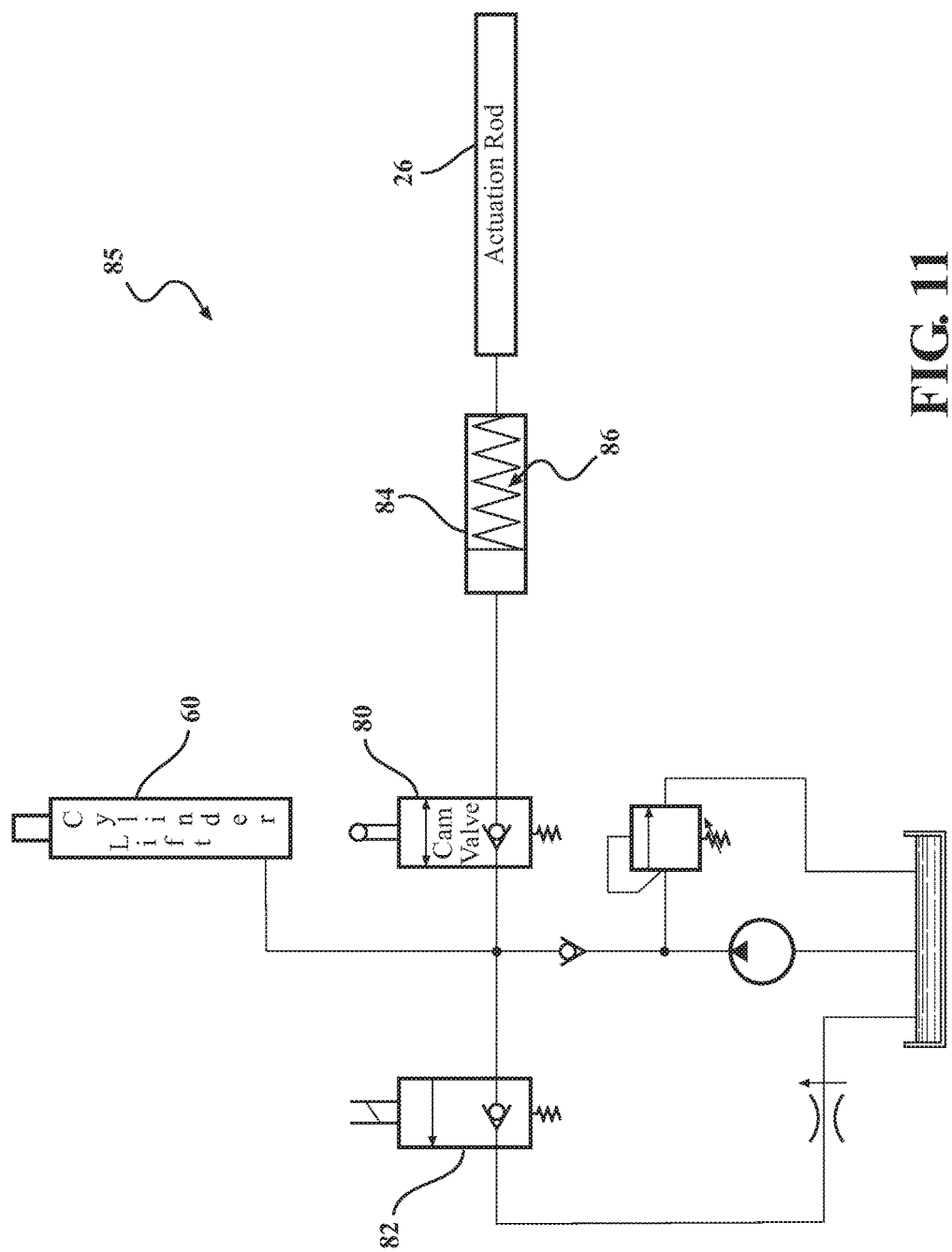
FIG. 11 depicts a hydraulic system according to one or more embodiments shown and described herein.

FIG. 11 schematically depicts an embodiment to transition the actuation rod 26 between the release and restrain positions. A hydraulic system 85 of the industrial vehicle comprises a cam valve 80, a lift cylinder 60, a release solenoid valve 82, and a rod cylinder 84, all of which are hydraulically coupled together. The cam valve 80, an example of which is part number DC6000SNC-V by Parker, is in an actuate state (i.e., hydraulic fluid flows freely through the cam valve 80) when the lift cylinder 60 is in a fully lowered state. As the lift cylinder 60 is commanded to raise, the cam valve 80 is open to the rod cylinder 84 which, through hydraulic pressure, transitions the actuation rod 26 from the release to the restrain position. When the rod cylinder 84 is fully actuated or transitioned, the rod cylinder 84 cannot accept any more hydraulic fluid and thus, the hydraulic fluid is diverted to the lift cylinder 60 to raise the cart transportation assembly 15 (see FIG. 1). As the lift assembly 67 (see FIGS. 8 and 9) is raised, the cam valve 80, which is coupled to the lift assembly 67, is lifted from a contact pad and closes (i.e., check valve) thereby keeping the hydraulic fluid in the rod cylinder 84, and the actuation rod 26 in the restrain position as the lift cylinder 60 raises and/or remains raised.

When the lift cylinder 60 is commanded to lower, the release solenoid valve 82 is opened. The cam valve 80 is still in a closed state and thus the actuation rod 26 remains in the restrain position. When the lift cylinder 60 is fully lowered, the cam valve 80 will contact the contact pad and open up, thereby allowing the hydraulic fluid in the rod cylinder 84 to escape. A bias force is exerted on the rod cylinder 84 to expel the hydraulic fluid by a die spring 86. The die spring 86 is not strong enough to overcome the pressure of the hydraulic fluid as the lift cylinder 60 is raised, but can expel the hydraulic fluid in the low pressure state of the hydraulic system 85 as the lift cylinder 60 is lowered. As the die spring 86, in combination with the rod cylinder 84, expels the hydraulic fluid from the rod cylinder 84, the actuation rod 26 is transitioned from the restrain to the release position. The location of the contact pad can be set such that the transition between the release and restrain position and vice versus occurs when the platform 30 is in close proximity to the floor.

Figure 4:
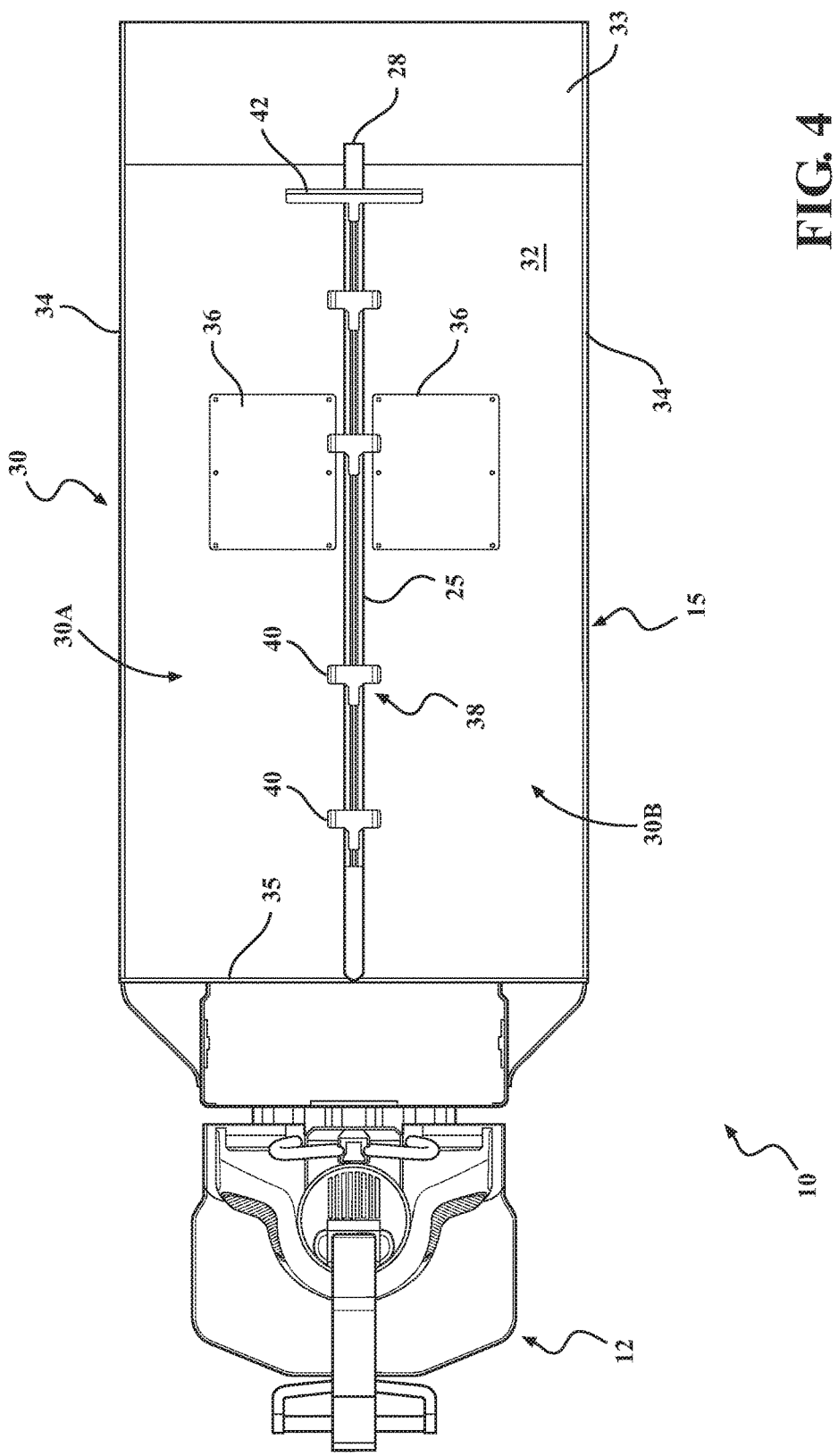
FIG. 4 depicts a top view of the industrial vehicle according to one or more embodiments shown and described herein.

Referring to FIG. 4, it is contemplated that the platform 30 could optionally comprise one or more depressions (not shown) that match or closely match the wheel footprint of the carts 70 (FIG. 10). The depressions may serve to provide tactile feedback to a user that the carts 70 are in the proper position for restraining the movement of the carts 70 once the cart transportation assembly 15 is raised. Further, the depressions additionally serve to restrain the movement of the carts 70 on the platform 30 while the actuation rod 26 is in the release position. It is also contemplated that the floors of the depressions may be selectively moveable in the vertical direction such that when the actuation rod 26 is moved to the release position, the floor of the depressions are selectively transitioned to raise such that they are close to or along the horizontal plane of the deck 32 of the platform 30 to aid in unloading ladened carts 70 from the platform 30.

It is also contemplated that the platform 30 may be on an incline such that the slope is towards the ramp 33. One example of accomplishing the incline is through the use of tapered forks on the industrial vehicle 10 upon which the cart transportation assembly 15 rests and is coupled to. With the incline, the carts 70 may be biased to roll off the platform 30. This may aid in unloading the carts in tight spaces, such as the back of a trailer for example. It is further contemplated that the selective use of the transitioning depressions in combination with the incline may aid in restraining the movement of the carts and/or unloading the carts 70 without the manual aid of a user.

Referring to FIG. 5, it is contemplated that a manual override handle (not shown) may be coupled to the top rail 25 in place of or near the end cap 28. The manual override handle may be used to manually transition the actuation rod 26 between the release and restrain positions.

Figure 12:
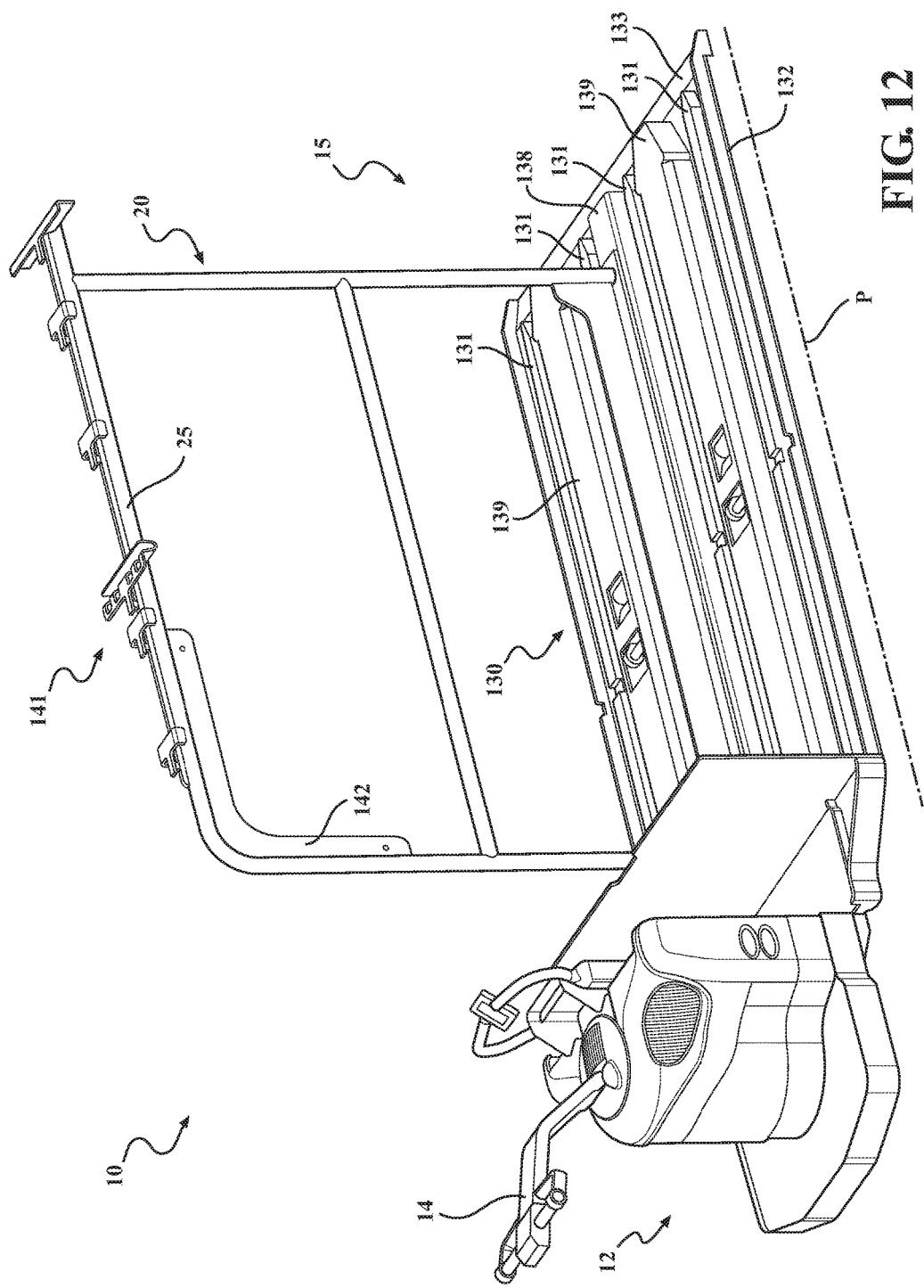
FIG. 12 depicts a rear isometric view of another embodiment of an industrial vehicle according to one or more embodiments shown and described herein.
Figure 13:
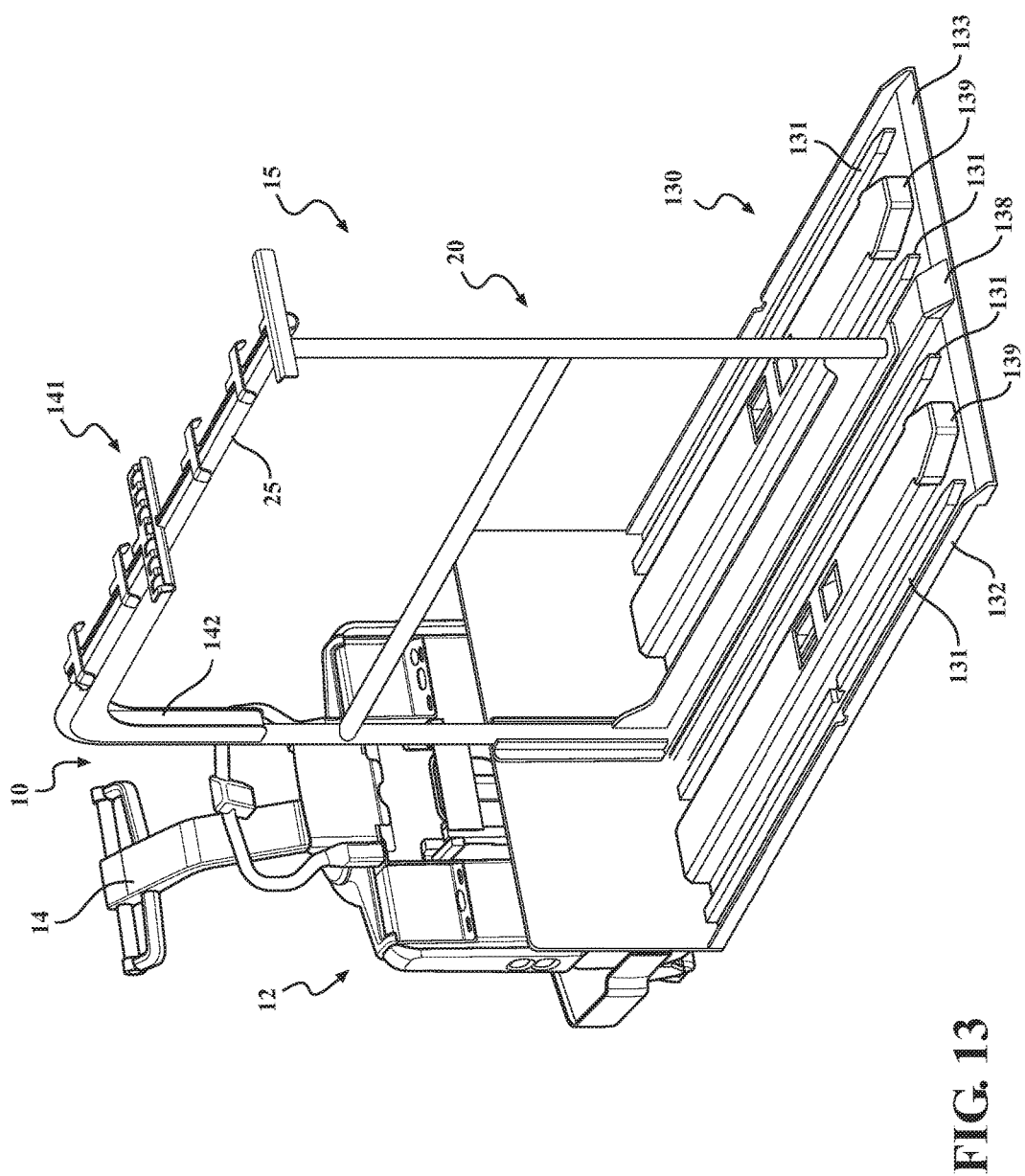
FIG. 13 depicts a front isometric view of the industrial vehicle according to one or more embodiments shown and described herein.
Figure 14:
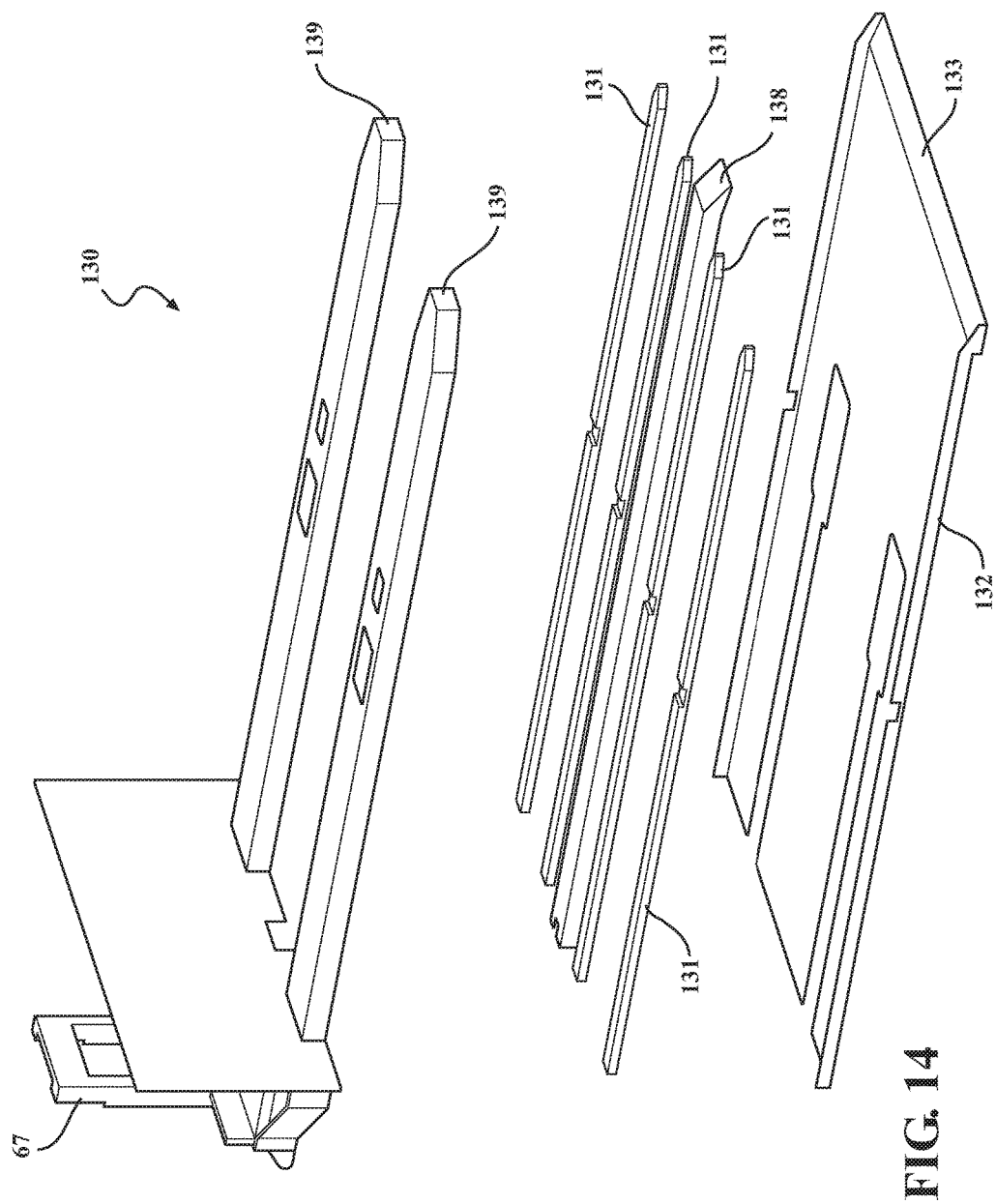
FIG. 14 depicts an exploded view of a cart transportation assembly according to one or more embodiments shown and described herein.

FIGS. 12-19 illustrate another embodiment of the cart transportation assembly 15. Referring first to FIGS. 12-14, the industrial vehicle 10 comprises a wheel platform 130 comprising one or more small wheel guides 131, one or more large wheel guides 139, and a center guide 138. It is contemplated that the one or more small wheel guides 131, one or more large wheel guides 139, and the center guide 138 restrain the wheels of a cart 70 (see FIG. 10) such that any caster wheels on the cart 70 are oriented by the one or more small wheel guides 131, one or more large wheel guides 139, and the center guide 138 and restrain them from flipping or rotating such that they bind and prevent the cart 70 from being loaded or unloaded from the cart transportation assembly 15.

Figure 15:
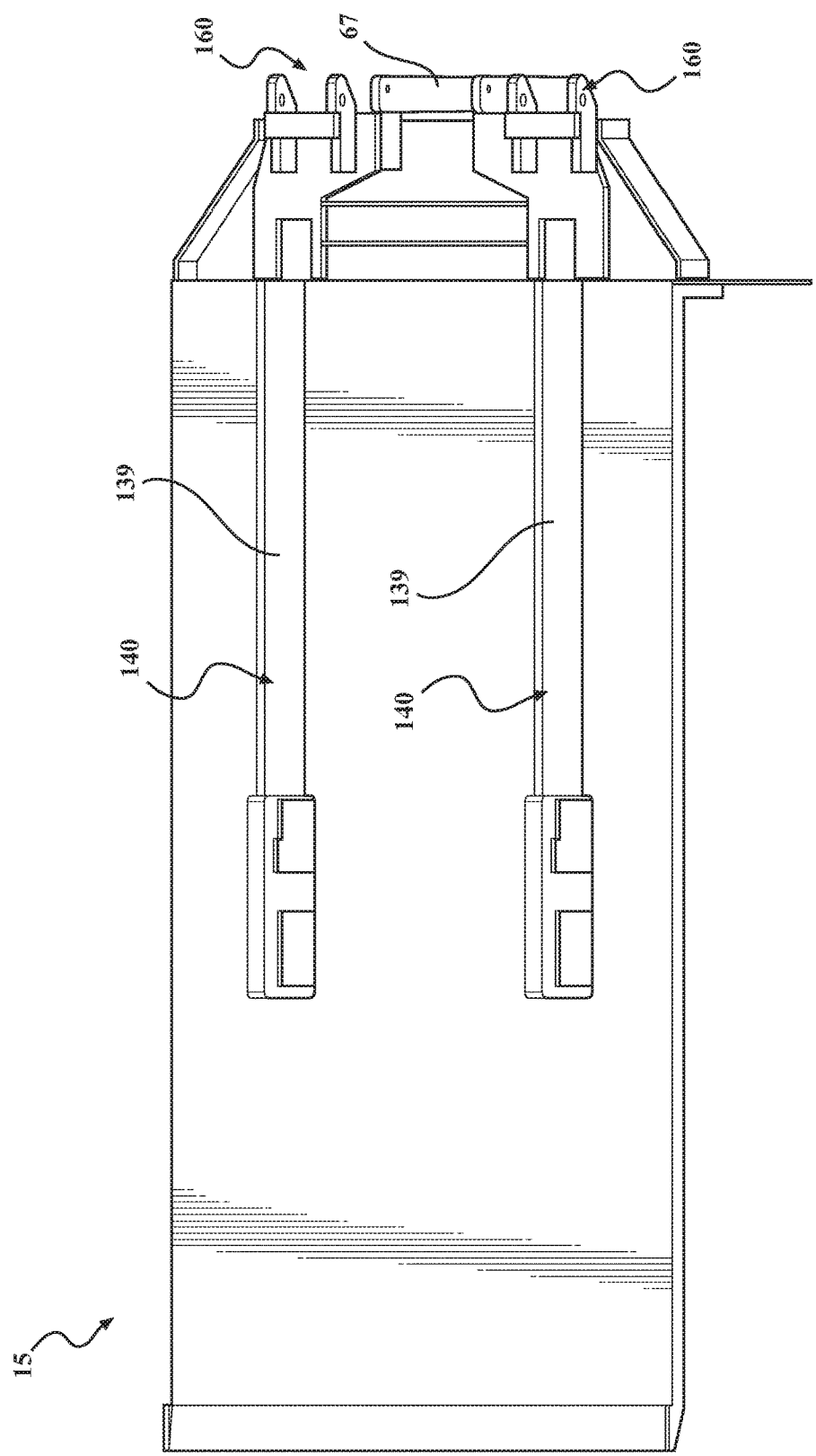
FIG. 15 depicts a bottom view of the cart transportation assembly according to one or more embodiments shown and described herein.

Referring to FIG. 15, it is contemplated that the one or more large wheel guides 139 comprise load wheel cavities 140 to accommodate the load wheel assemblies 21 (see FIG. 2) that raise and lower the cart transportation assembly 15.

It is contemplated that the drive unit 12 (see FIG. 1) does not comprise forks and the cart transportation assembly 15 does not comprise fork pockets such that the drive unit 12 is separable from the cart transportation assembly 15 without mechanical intervention, such as disassembly of the lift assembly 67 (see FIG. 8) from the cart transportation assembly 15. In such a configuration, the cart transportation assembly 15 comprises the load wheel cavities 140 to allow the load wheel assembly 21 to operate. It is contemplated that with the load wheel assemblies 21 being situated partially above the wheel deck 132, the wheel platform 130 is closer to a travel plane p of the industrial vehicle 10 (see FIG. 12) such that a wheel ramp 133 has a lesser slope than that of the ramp 33 illustrated in FIG. 1. This enables one or more carts 70 (see FIG. 10) to transition onto or off of the wheel deck 132 of the wheel platform 130 with less effort on the part of a user and decreases the amount of kinetic energy a ladened cart 70 may have rolling down the wheel ramp 133 when compared to the ramp 33 of the above embodiment.

Figure 18:
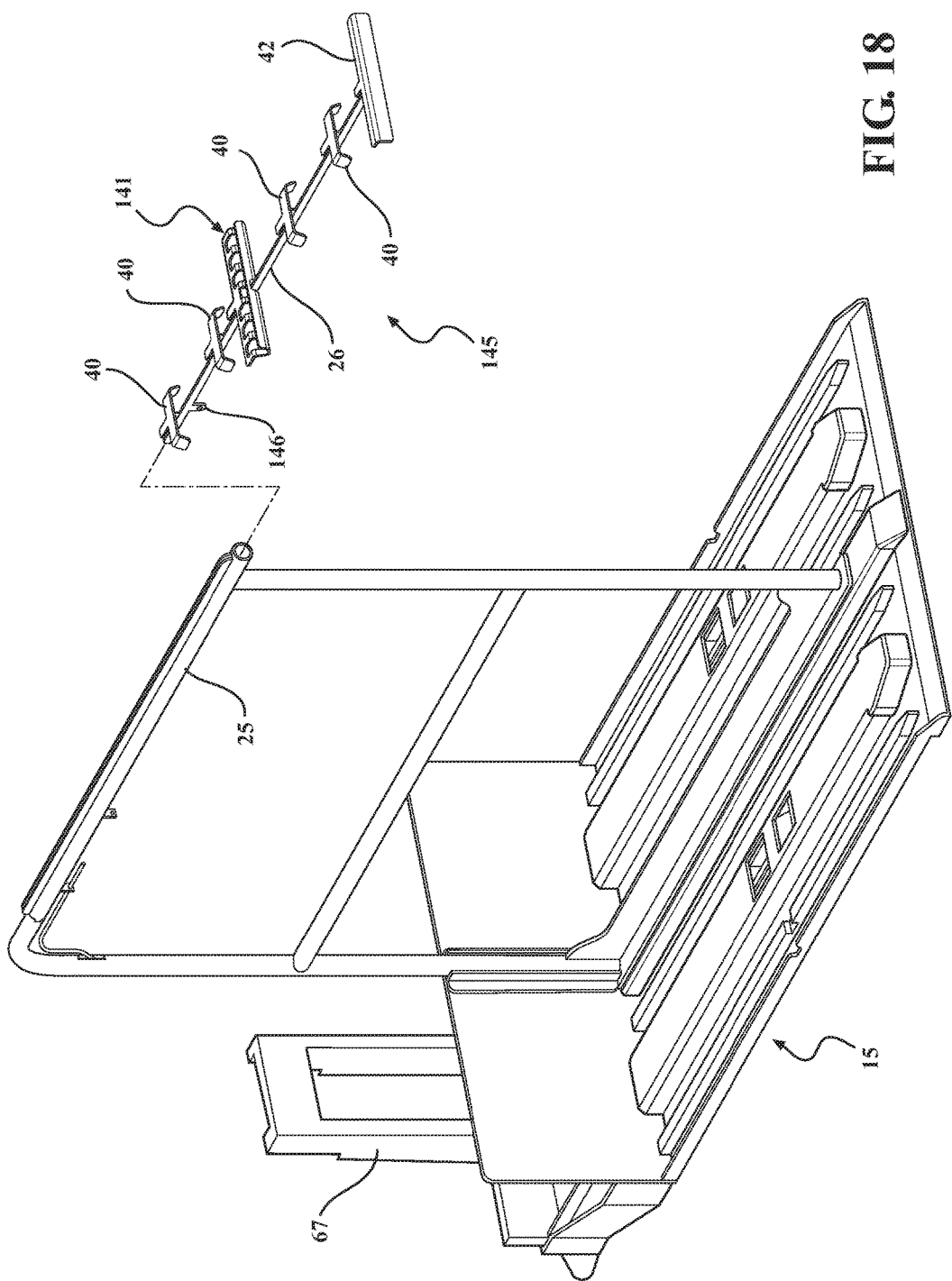
FIG. 18 depicts an exploded view of the top rail according to one or more embodiments shown and described herein.
Figure 20:
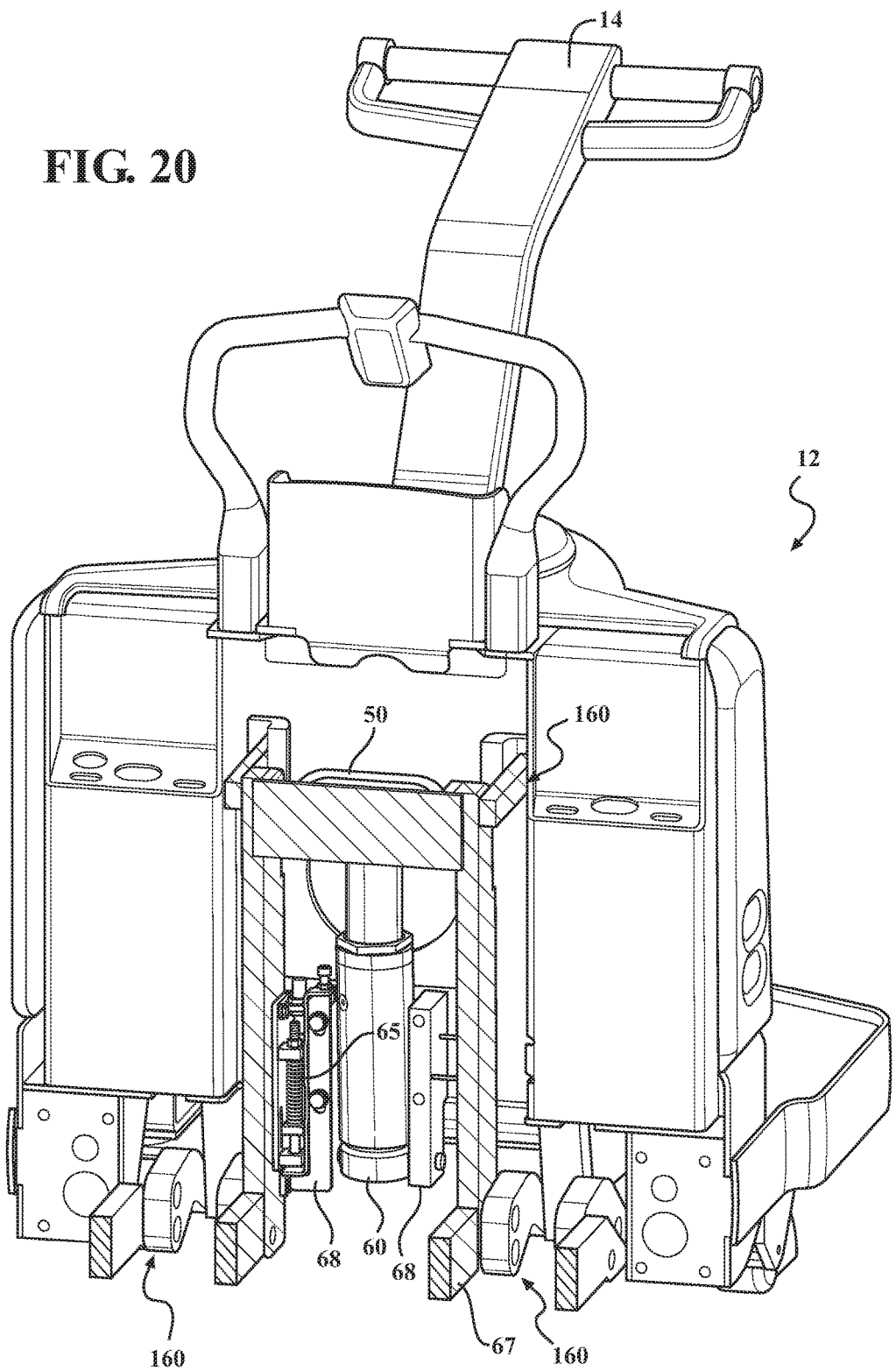
FIGS. 20-23 depict a drive unit according to one or more embodiments shown and described herein.

Referring back to FIGS. 12 and 13, the cart transportation assembly 15 according to this embodiment comprises the frame 20 with top rail 25 as discussed hereinabove and a cable cover 142. It is contemplated that the top rail 25 further comprises a center cart latch 141. Referring to FIGS. 16-18, the center cart latch 141 comprises a fore ramp 144 and an aft ramp 143 situated at an angle ø' (see FIG. 17). It is contemplated that the center cart latch 141, when lowered into the restrain position, serves to separate two carts 70 (see FIG. 10). It is also contemplated that the center cart latch 141 may serve as a cart stop (like the cart stop 42 shown in FIG. 1 and described hereinabove) for a single cart 70 positioned against the back stop 35. The angle ø' may optionally be adjusted such that the center cart latch 141 can position itself between two carts 70 without additional force needed above the biasing force exerted by the extension spring 27 (see FIGS. 4, 5, 17, and 19). In other words, it is contemplated that the angle ø' may be changed to suit the specific configuration of the carts 70 used with the cart transportation assembly 15.

Referring to FIG. 18, a latch assembly 145 may be inserted into the top rail 25. The latch assembly 145 comprises a rod tab 146 and the one or more cart latches 40, the cart stop 42, and the center cart latch 141 coupled to the actuation rod 26. The pivot pin(s) 43 (see FIGS. 5 and 6) may be inserted once the latch assembly 145 is positioned within the top rail 25 to pivotally couple each cart latch 40, the center cart latch 141, and the cart stop 42 to the top rail 25.

Referring to FIGS. 17 and 19, the yoke block 29 is coupled to the rod tab 146, the extension spring 27, and the actuation cable 50 and facilitates the push/pull forces on the actuation rod 26 between the extension spring 27 (restrain position) and the actuation cable 50 (release position) to transition the one or more cart latches 40, the cart stop 42, and the center cart latch 141 between the release and restrain positions. As noted above, the release position is shown in FIG. 5 and the restrain position is shown in FIG. 6.

Still referring to FIGS. 17 and 19, the cable cover 142 (see FIG. 12) covers a cable assembly 150 comprising a portion of the actuation cable 50, a cable flange 151, the yoke block 29, the extension spring 27, a spring flange 152, and the rod tab 146. The actuation cable 50 comprises the cable sheath 50A and the inner cable portion 50B. The cable sheath 50A is coupled to the cable flange 151 and the inner cable portion 50B is coupled to the yoke block 29. The actuation cable 50 may be a push/pull type cable used to transition the actuation rod 26 as described hereinbefore. It is contemplated that as the drive unit 12 (see FIG. 1) lifts the cart transportation assembly 15, as described in relation to FIGS. 8 and 9, the actuation cable 50 and the extension spring 27 transition the latch assembly 145 (see FIG. 18) to the restrain position and vice versus for when the cart transportation assembly 15 is lowered.

Referring to FIGS. 19A and 19B, the preload of the extension spring 27 can be set as desired, e.g., to set the distances L' and L" as shown in FIGS. 19A and 19B, respectively, by the tightening of a nut assembly 152A on a threaded fastening member 152B, which is affixed to the extension spring 27 and engaged with the spring flange 152. Setting the spring preload in this manner is done to set the resultant downward force of the cart latches 40, cart stop 42, and center cart latch 141 while in the restrain position, as well as to set the tension in these components while in the release position. Additionally, one of more spacers or shims 152C may be inserted into a spacer location 152D to further adjust the preload of the extension spring 27.

Referring to FIGS. 8, 9 14, 15, and 18, the lift assembly 67 is coupled to the drive unit 12 via one or more mounting locations 160.

FIGS. 20-23 illustrate another drive unit 12 that can be used with the cart transportation assembly 15. The drive unit 12 comprises a lift cylinder 60, an actuation cable 50 (see FIG. 22), a lift flange 63 (see FIG. 22), a base flange 64, a cable spring 65, a vertical pin 69, upper and lower pin supports 69A, 69B, a slider flange 71, a lift assembly 67, and a cylinder mount 68. The extension spring 65 is wound around a main portion of the vertical pin 69, wherein upper and lower portions of the vertical pin 69 extends through respective apertures (not shown) formed in the upper pin support 69A, the slider flange 71, and the lower pin support 69B. The lift cylinder 60 is coupled to the drive unit 12 and the cylinder mount 68. The base flange 64 is coupled to the cylinder mount 68. The lift cylinder 60, the upper and lower pin supports 69A, 69B, and the lift flange 63 are coupled to the lift assembly 67. The lift assembly 67 is coupled to the cart transportation assembly 15 (see FIG. 1). The slider flange 71 is affixed to the inner cable portion 50B of the actuation cable 50 and to the vertical pin 69 (see FIG. 22), and defines a lower abutment surface for the extension spring 65. The upper pin support defines an upper abutment surface for the extension spring 65.

Figure 21:
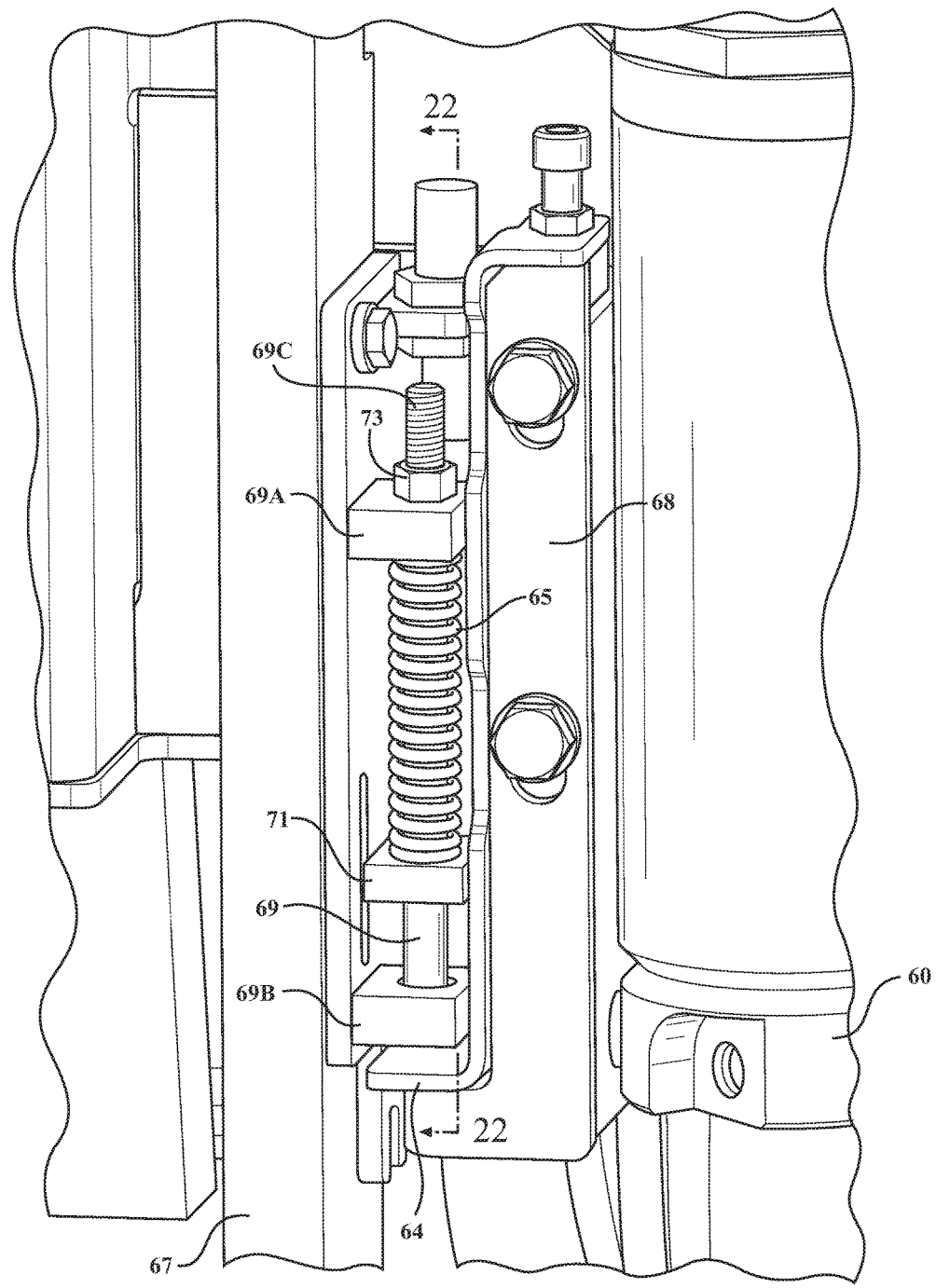
Figure 22:
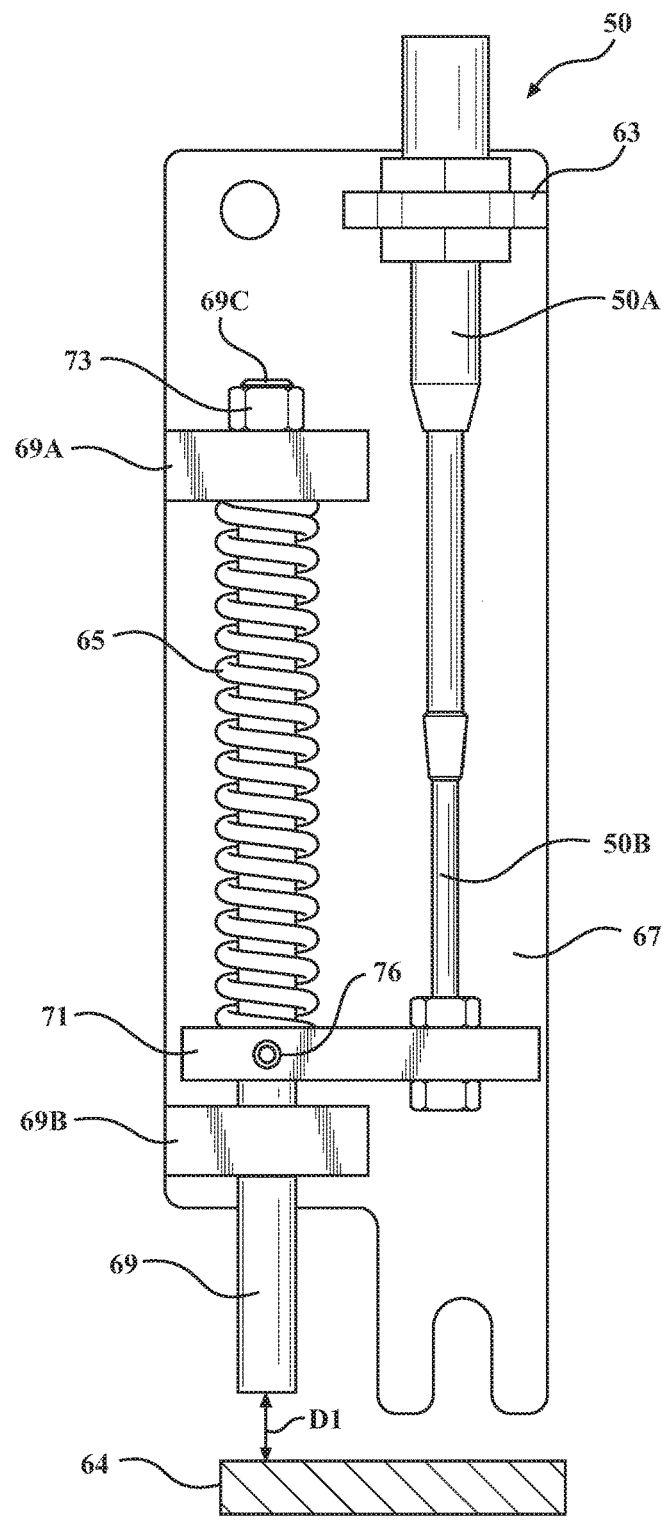
Figure 23:
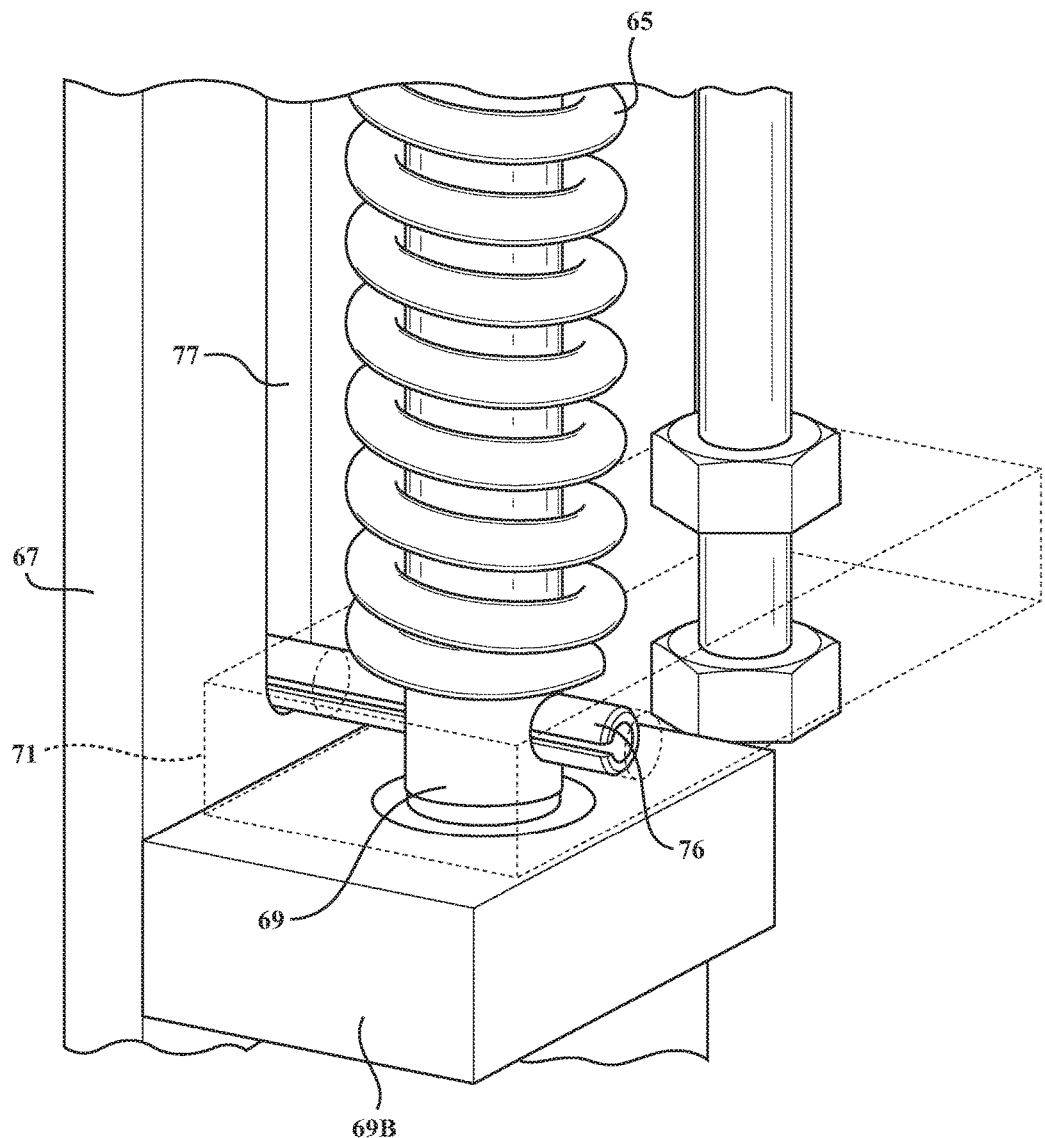

During assembly, a nut 73 is threaded onto a threaded upper surface 69C of the pin 69 and tightened to provide the extension spring 65 with a desired preload sufficient to set the resultant downward force of the components of the latch assembly 145 while in the restrain position. For illustration purposes, the nut 73 is shown in FIG. 21 in a first position to provide the extension spring 65 with a greater amount of preload, and the nut 73 is shown in FIG. 22 in a second position, closer to the upper end of the vertical pin 69 than the first position, to provide the extension spring 65 with a lesser amount of preload. With reference to FIG. 23, a roll pin 76 may be provided to pass through the vertical pin 69 and slider arm 71, and then through a slot 77 formed in the lift assembly 67 to prevent rotation of the pin 69 and slider arm 71. The extension of the roll pin 76 through the slot 77 prevents rotation of the vertical pin 69 and slider arm 71.

The lift cylinder 60 raises and lowers the cart transportation assembly 15. As the lift cylinder 60 raises, a distance D1 between the lower surface of the vertical pin 69 and base flange 64 (see FIG. 22) increases, and as the lift cylinder 60 lowers, the distance D1 between the lower surface of the vertical rod 69 and the base flange 64 decreases. When the lift cylinder 60 and lift assembly 67 move down, the lower surface of the vertical pin 69 eventually contacts the base flange 64, where further downward movement of the lift cylinder 60 and lift assembly 67 causes the pin to move upwardly against the biasing force of the extension spring 65, and thus causing compression of the extension spring 65 and upward movement of the slider arm 71. The upward movement of slider arm 71 draws the inner cable portion 50B into the cable sheath 50A, resulting in a transition of the actuation rod 26 and latch assembly 145 into the release position as described herein. Movement of the lift cylinder 60 and lift assembly 67 in the upward direction has the opposite effect to transition the actuation rod 26 and latch assembly 145 into the restrain position.

In accordance with an embodiment, a switch (not shown) may be incorporated into the traction and lift circuits of the vehicle 10, so that when an operator lowers a tiller 14 of the vehicle 10 (see FIG. 1) to a traction (driving) position, the forks of the vehicle 10 automatically raise and the latch assembly 145 secures any carts 70 on board of the cart transportation assembly 15 prior to traction being initiated. For example and not by way of limitation, once the tiller 14 is moved to this position, the forks will raise 2.5" off of the floor 75, so as to prevent the vehicle 10 from being driven while the platform 32 is lowered. Once this feature is effected, full lift of the platform 32 is available as desired.

It is contemplated that the features of each described embodiment of the cart transportation assembly 15 and drive unit 12 may be interchangeable such that multiple embodiments are contemplated and are not limited to only those shown. For example, and not by way of limitation, the cart transportation assembly 15 of FIGS. 12-19 may include the transitioning depressions as described herein above, or may include depressions such as slits to aid in restraining the carts 70 on the cart transportation assembly 15. Though not described in relation to the embodiment in FIGS. 12-19, they are contemplated.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Certain terminology is used in the disclosure for convenience only and is not limiting. The words "left", "right", "front", "back", "upper", and "lower" designate directions in the drawings to which reference is made. The terminology includes the words noted above as well as derivatives thereof and words of similar import.

As used herein, "pivotally coupled" means that two objects coupled together to resist linear motion and to facilitate rotation or oscillation between the objects.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cart transportation assembly comprising:
a frame including at least one upright and a top rail supported by the at least one upright, the top rail comprising a main body portion, an actuation rod, and a plurality of cart latches coupled to the actuation rod, wherein the actuation rod is movable relative to the main body portion to transition the cart latches between release and restrain positons; and
a platform providing structural support for the frame and including a deck for supporting at least one cart;
wherein:
the cart latches, when in the release position, are adapted to allow movement of the at least one cart on the deck of the platform; and
the cart latches, when in the restrain position, are adapted to restrain movement of the at least one cart on the deck of the platform by pulling the at least one cart towards and against or in close proximity to the frame.

2. The cart transportation assembly of claim 1, wherein the actuation rod moves horizontally within an interior portion of the top rail.

3. The cart transportation assembly of claim 2, wherein the cart latches pivot with respect to the main body portion when transitioning between the release and restrain positons.

4. The cart transportation assembly of claim 3, wherein each cart latch is coupled to the actuation rod via a respective an actuation pin, and each cart latch is coupled to the main body portion via a respective pivot pin.

5. The cart transportation assembly of claim 1, further comprising an extension spring that biases the actuation rod such that the cart latches are at rest in the release position.

6. The cart transportation assembly of claim 1, wherein the cart latches comprise tapered side wings that facilitate pulling the at least one cart towards and against or in close proximity to the frame.

7. The cart transportation assembly of claim 1, wherein the frame further comprises a center cart latch that, when in the restrain position, is adapted to separate two carts that are on the deck of the platform.

8. The cart transportation assembly of claim 1, wherein the frame further comprises a cart stop that is also transitioned between the release and restrain positions by the actuator rod, wherein the cart stop, while in the restrain position, is adapted to restrain movement of the at least one cart in a longitudinal direction of the platform.

9. The cart transportation assembly of claim 1, further comprising an actuation cable coupled to the actuation rod, the actuation cable effecting movement of the actuation rod relative to the main body portion.

10. The cart transportation assembly of claim 9, wherein movement of the actuation cable is driven by a lift cylinder of an associated industrial vehicle.

11. The cart transportation assembly of claim 1, wherein the transition between the release and restrain position and vice versus occurs when the platform is in close proximity to the floor.

12. The cart transportation assembly of claim 1, wherein the deck comprises at least one wheel guide for restraining at least one wheel of the at least one cart.

13. A cart transportation assembly comprising:
a frame including at least one upright and a top rail supported by the at least one upright, the top rail comprising a main body portion, an actuation rod, and at least one cart latch coupled to the actuation rod, wherein the actuation rod is movable horizontally within an interior portion of the main body portion to transition the at least one cart latch between release and restrain positons; and
a platform providing structural support for the frame and including a deck and a ramp;
wherein:
 the at least one cart latch, when in the release position, is adapted to allow movement of at least one cart on the deck of the platform; and
 the at least one cart latch, when in the restrain position, is adapted to restrain movement of the at least one cart on the deck of the platform by pulling the at least one cart towards and against or in close proximity to the frame.

14. The cart transportation assembly of claim 13, wherein the at least one cart latch pivots with respect to the main body portion when transitioning between the release and restrain positons.

15. The cart transportation assembly of claim 14, wherein the at least one cart latch is coupled to the actuation rod via an actuation pin, and the at least one cart latch is coupled to the main body portion via a pivot pin.

16. The cart transportation assembly of claim 13, further comprising an extension spring that biases the actuation rod such that the at least one cart latch is at rest in the release position.

17. The cart transportation assembly of claim 13, wherein the at least one cart latch comprises tapered side wings that facilitate pulling the at least one cart towards and against or in close proximity to the frame.

18. The cart transportation assembly of claim 13, wherein the frame further comprises a center cart latch that, when in the restrain position, is adapted to separate two carts that are on the deck of the platform.

19. The cart transportation assembly of claim 13, wherein the frame further comprises a cart stop that is also transitioned between the release and restrain positions by the actuator rod, wherein the cart stop, while in the restrain position, is adapted to restrain movement of the at least one cart in a longitudinal direction of the platform.

20. The cart transportation assembly of claim 13, further comprising an actuation cable coupled to the actuation rod, the actuation cable effecting movement of the actuation rod relative to the main body portion, wherein movement of the actuation cable is driven by a lift cylinder of an associated industrial vehicle.

* * * * *